United States Patent
Peltz

(10) Patent No.: US 9,090,415 B2
(45) Date of Patent: Jul. 28, 2015

(54) SYSTEM AND METHOD FOR ROLLING A VEHICLE TO UNLOAD CARGO

(75) Inventor: David Michael Peltz, Melbourne, FL (US)

(73) Assignee: General Electric Company, Schenectady, NY (US)

( * ) Notice: Subject to any disclaimer, the term of this patent is extended or adjusted under 35 U.S.C. 154(b) by 393 days.

(21) Appl. No.: 13/603,538

(22) Filed: Sep. 5, 2012

(65) Prior Publication Data

US 2014/0064907 A1   Mar. 6, 2014

(51) Int. Cl.
*B65G 67/00* (2006.01)
*B65G 67/44* (2006.01)

(52) U.S. Cl.
CPC ...................................... *B65G 67/44* (2013.01)

(58) Field of Classification Search
USPC ........... 414/354, 357, 782; 118/322; 198/373, 198/375, 377; 105/241.1, 241.2
See application file for complete search history.

(56) References Cited

U.S. PATENT DOCUMENTS

| | | | |
|---|---|---|---|
| 1,491,060 A * | 4/1924 | O'Toole | 414/357 |
| 1,893,633 A * | 1/1933 | Peterson et al. | 414/384 |
| 3,332,535 A * | 7/1967 | Hubert | 414/356 |
| 3,889,605 A | 6/1975 | Bacon | |
| 4,032,026 A * | 6/1977 | McCormick | 414/357 |
| 4,240,355 A | 12/1980 | Puariea | |
| 4,407,202 A | 10/1983 | McCormick | |
| 5,017,077 A | 5/1991 | Dowden | |
| 5,590,995 A * | 1/1997 | Berkers et al. | 414/357 |
| 6,192,804 B1 | 2/2001 | Snead | |
| 7,083,375 B2 | 8/2006 | Lewis | |
| 2012/0048627 A1 | 3/2012 | Insana | |

* cited by examiner

*Primary Examiner* — Saul Rodriguez
*Assistant Examiner* — Emery Hassan
(74) *Attorney, Agent, or Firm* — GE Global Patent Operation; John A. Kramer

(57) ABSTRACT

A system for rolling a vehicle includes first and second guide tracks. The guide tracks extend over a receptacle positioned to receive cargo being carried by the vehicle. The guide tracks are elongated from an input segment to an output segment of the route. The first and second guide tracks are disposed on opposite sides of the input and output segments. The guide tracks are shaped to engage first and second guides, respectively, that are coupled to the vehicle when the vehicle travels from the input segment of the route toward the output segment of the route and over the receptacle. The guide tracks are curved over the receptacle to translate movement of the vehicle over the receptacle from the input segment of the route to the output segment of the route into a rolling motion of the vehicle that causes the cargo to be dumped into the receptacle.

31 Claims, 16 Drawing Sheets

SYSTEM AND METHOD FOR ROLLING A VEHICLE TO UNLOAD CARGO

FIELD

Embodiments of the inventive subject matter described herein relate to rotating vehicles to unload cargo being carried by the vehicles.

BACKGROUND

Some known vehicles carry cargo between locations for various purposes. This cargo can include a variety of bulk commodities moved about a manufacturing facility such as plastic pellets, glass beads, wet or dry chemicals, and the like. This cargo can also be the type considered as heavy haul bulk commodity such as grain, coal, ore, sugar, fertilizers, and the like. The vehicles can include wheeled hopper wagons or rail cars such gondola cars, all of which can be linked and assembled into trains of vehicles.

In order to unload the cargo from these vehicles, some vehicles have doors fitted to the bottom or sides of the cars of the vehicles. These doors are able to be opened so that the cargo can fall from the cars into other containers or a conveyor system. Using doors for unloading vehicles may be intermittent where the vehicle is stopped to open the door, or continuous where the door is opened while the vehicle is moving. Using doors for unloading increases the design complexity, weight, and unreliability of the vehicles due to hinges, latching mechanisms, door opening and closing mechanisms, and components used to seal the doors. For cargo that is in the form of small or fine particle size, sealing doors to prevent loss of the product becomes even more complex and costly.

Some other known systems for dumping cargo from vehicles are rotary dumpers that provide for moving the vehicle onto or within a rotating, device that inverts the entire vehicle. Rotary dumping places the complexity and reliability burden on the single, stationary rotating device leaving the vehicles to be relatively simple hoppers. For cargo transportation systems that may have hundreds of vehicles, keeping the vehicles simple results in superior cost effectiveness. Rotary dumping, however, is intermittent by its nature, which slows the overall dumping process and requires a means for proper alignment of the vehicle(s) within the rotating portion of the dumper. Intermittent dumping lowers the reliability of the vehicles in a consist (such as a train) due to starting and stopping forces. Rotary dumpers also require that the connections between the rotating and non-rotating vehicles in the train accommodate the rotation.

It would be desirable to have rotating dumping means that reduces vehicle complexity, yet allows continuous rather than intermittent operation.

BRIEF DESCRIPTION

In one embodiment, an apparatus for rotating a vehicle to dispense cargo from the vehicle includes at least first, second, and third guide tracks. The guide tracks extend over a receptacle positioned to receive the cargo being carried by the vehicle. The guide tracks are elongated from an input segment of a route (along which the vehicle is traveling) to an output segment of the route. The input and output segments are located on opposite sides of the receptacle along a direction of travel of the vehicle. The input and output segments can be separated by a gap in the direction of travel, where the gap is disposed above (e.g., with respect to the direction in which gravity pulls objects) the receptacle. The first and second guide tracks are disposed on opposite first and second lateral sides, respectively, of the input segment of the route and the output segment of the route at a first vertical displacement. For example, the first and second guide tracks can be located along the opposite lateral sides of the input and output segments of the route such that the vehicle travels between the first and second guide tracks. The third guide track is disposed on the first side or the second side of the input segment of the route and on the first side or the second side of the output segment of the route at a second vertical displacement.

The first guide track and the second guide track are shaped to engage first and second guides, respectively, that are coupled to opposite first and second sides of the vehicle at the first vertical displacement on the vehicle when the vehicle travels from the input segment of the route toward the output segment of the route and over the receptacle. The third guide track is shaped to engage a third guide that is coupled to the first or second side of the vehicle at a second vertical displacement on the vehicle when the vehicle travels from the input segment of the route toward the output segment of the route and over the receptacle. The guide tracks are uniquely curved over the receptacle to translate movement of the vehicle over the receptacle from the input segment of the route to the output segment of the route into a rolling motion of the vehicle about an axis of a rotary coupler of the vehicle. This rolling motion causes the cargo being carried by the vehicle to be dumped into the receptacle.

In another embodiment, a method for rolling a vehicle to unload cargo being carried by the vehicle includes engaging a first guide coupled to the vehicle with a first curved guide track that extends over a receptacle positioned to receive cargo being carried by the vehicle. The first curved guide track is elongated from an input segment of a route that leads the vehicle toward the receptacle to an output segment of the route that leads the vehicle away from the receptacle. The method also includes engaging a second guide coupled to the vehicle with a second curved guide track also extending over the receptacle and also elongated from the input segment of the route to the output segment of the route. The method also includes engaging at least a third guide coupled to the vehicle with a third curved guide track also extending over the receptacle and also elongated from the input segment of the route to the output segment of the route. The method further includes translating movement of the vehicle from the input segment of the route toward the output segment of the route into a rolling motion of the vehicle about a desired axis of rotation by the location of the first, second, and third guides, and the shape of the first, second, and third curved guide tracks along the route. The rolling motion of the vehicle causes the cargo that is carried by the vehicle to be dumped into the receptacle.

In another embodiment, another system for a system for rolling a vehicle to dispense cargo from the vehicle includes first, second, and third guide tracks. The first guide track extends over a receptacle positioned to receive the cargo being carried by the vehicle. The first guide track is elongated from an input segment of a route that leads the vehicle toward the receptacle to an output segment of the route that leads the vehicle away from the receptacle. The second guide track also extends over the receptacle and is elongated from the input segment of the route to the output segment of the route. The third guide track also extends over the receptacle and is elongated from the input segment of the route to the output segment of the route. The first and second guide track are shaped to engage a first and second guide, that are coupled on one side of the vehicle, and the third guide track is shaped to engage a third guide that is coupled to the opposite side of the vehicle when the vehicle travels from the input segment of the route toward the output segment of the route and over the receptacle. At least a portion of the first and second guide track is vertically curved along an upward path, at least a portion of the third guide track is vertically curved along a downward path, and both the first guide track and the second guide track are at least partially curved in opposite lateral direction of the third guide track as oriented transverse to a direction of travel of the vehicle as the. The guide tracks are curved to translate movement of the vehicle in the direction of travel over the receptacle from the input segment of the route to the output segment of the route into a rolling motion of the vehicle that causes the cargo carried by the vehicle to be dumped into the receptacle.

In another embodiment, a system comprises a network of rail track defining a plane, and a receptacle. At least a portion of the receptacle (for receiving dumped cargo) is located below the plane. The network of rail track comprises an input track segment leading to, and terminating at, the receptacle, and an output track segment leading to, and terminating at, the receptacle. The system further comprises a first guide track and a second guide track both extending over the receptacle between the input track segment and the output track segment. The first guide track and the second guide track are curved across the receptacle for at least partially inverting a non-powered rail vehicle engaged by the first guide track and the second guide track over the receptacle, for dumping cargo of the non-powered rail vehicle into the receptacle, when the non-powered rail vehicle is pulled or pushed from the input track segment over the receptacle to the output track segment. The network of track further comprises a bypass track segment coupled to the input track segment and to the output track segment and extending, around the receptacle. The bypass track segment allows a powered rail vehicle that pulls the non-powered rail vehicle to be decoupled from the non-powered rail vehicle at the input track segment, motored over the bypass track segment for bypassing the receptacle, and at least indirectly recoupled to the non-powered rail vehicle at the output track segment for pulling the non-powered rail vehicle over the receptacle.

In another embodiment, a system (e.g., for travel of one or more vehicles) includes a network of rail track and a receptacle. The network of rail track defines a plane. At least a portion of the receptacle for receiving dumped cargo is located below the plane. The network of rail track includes an input track segment, an output track segment, a first guide track, and a second guide track. The input track segment leads to, and terminates at, the receptacle, and the output track segment leads to, and terminates at, the receptacle. The first guide track and the second guide track both extend over the receptacle between the input track segment and the output track segment. The first guide track and the second guide track are curved across the receptacle for at least partially inverting a non-powered rail vehicle engaged by the first guide track and the second guide track over the receptacle, for dumping cargo of the non-powered rail vehicle into the receptacle, when the non-powered rail vehicle is pulled or pushed from the input track segment over the receptacle to the output track segment. The network of track further comprises a bypass track segment coupled to the input track segment and to the output track segment and extending around the receptacle. The bypass track segment is for a powered rail vehicle that pulls the non-powered rail vehicle to be decoupled from the non-powered rail vehicle at the input track segment, motored over the bypass track segment for bypassing the receptacle, and at least indirectly recoupled to the non-powered rail vehicle at the output track segment for pulling the non-powered rail vehicle over the receptacle.

In another embodiment, a method (e.g., for operating a vehicle consist) includes motoring a vehicle consist along a route towards a receptacle. The vehicle consist includes a first powered vehicle, a second powered vehicle, and a plurality of non-powered vehicles disposed between the first powered vehicle and the second powered vehicle. The method also includes subsequently decoupling the first powered vehicle from the vehicle consist and motoring the first powered vehicle along a bypass route around the receptacle. The method further includes subsequently pushing the plurality of non-powered vehicles, by the second powered vehicle, over and across the receptacle. The non-powered vehicles are engaged by plural curved guide tracks extending across the receptacle, as the non-powered vehicles are pushed over and across the receptacle, for at least partial inversion of the non-powered vehicles and continuous sequential dumping, of cargo carried by the non-powered vehicles into the receptacle. The method also includes subsequently recoupling the first powered vehicle to the consist for pulling, the non-powered vehicles over and across the receptacle under guidance of the guide tracks.

BRIEF DESCRIPTION OF THE DRAWINGS

Reference is now made briefly to the accompanying drawings, in which.

DETAILED DESCRIPTION

Figure 1:
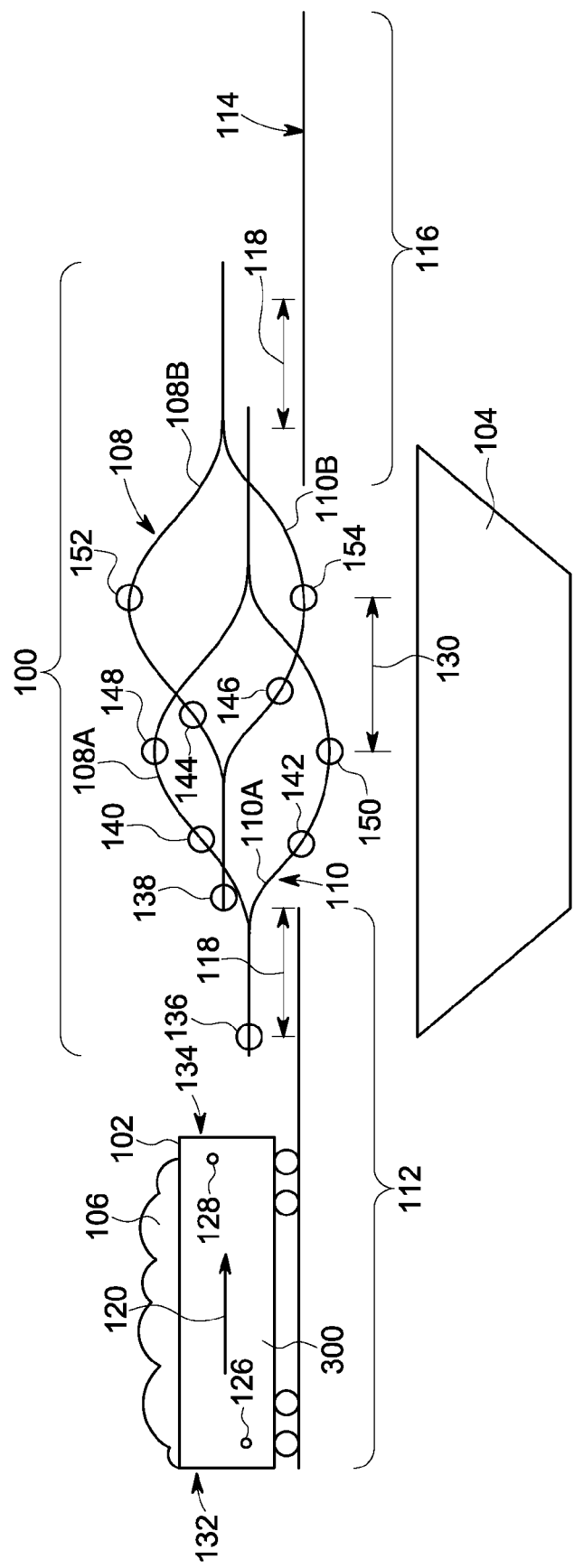
FIG. 1 is a side view of one embodiment of a rolling system.

In accordance with one or more embodiments described herein, rolling systems are provided that include plural curved and elongated guide tracks that extend over a receptacle from an input segment of a route to an output segment of the route. The input and output segments of the route may be disposed on opposite ends of the receptacle along a direction of travel of a vehicle moving along the route. The input and output segments also may be separated by a gap over the receptacle. The guide tracks are positioned to engage guides coupled with the vehicle such that the guide tracks support the vehicle above the receptacle as the vehicle moves from the input segment of the route to the output segment of the route. The guide tracks are curved such that movement of the vehicle in the direction of travel along the route is translated into a rolling motion or movement of the vehicle. For example, linear movement of the vehicle (e.g., whether self-propelled, pushed by another vehicle, and/or pulled by another vehicle) is translated by the curved guide tracks into rolling of the vehicle about (e.g., around) a longitudinal axis of the vehicle. This longitudinal axis may be oriented along e.g., parallel to and/or collinear with) the direction of travel of the vehicle. The guide tracks can convert the movement into the rolling motion such that the cargo being carried by the vehicle is dumped from the vehicle into the receptacle. The guide tracks can then convert continued movement of the vehicle in the direction of travel into a reversed rolling motion to return the vehicle to an upright position when or before the vehicle reaches the output segment of the route. The vehicle may then exit the system along the output segment of the route.

One known system for rotating in a continuous fashion is used in the entertainment industry in the form of a roller-coaster that performs a barrel-roll and other maneuvers as described by Karl Bacon in U.S. Pat. No. 4,889,605. Bacon describes the use of two rails which are formed with correlating helical twists including entrance and exit spirals. In practice, the individual car bodies have a single axle that is perpendicular to the pair of rails and extends laterally from both sides of the car body. Wheels on the axle engage the twisting rails to hold the vehicles to the rails. As the cars traverse the pair of rails the interaction of the rails and wheels impart a lateral rotation and longitudinal pitch to the car bodies. Since there is a single axle for each car body, there are only two points of suspension per individual body. With only two points of suspension, the car bodies will also tend to pivot about the axle creating an undesired forward and aft pitching motion. This undesired pitching is controlled and constrained by design of the car-to-car coupling components.

The use of the above roller-coaster method having the two point suspension of the roller coaster car bodies may not be useful for rotating heavy haul cars in order to dump cargo from the cars. Controlling the undesired fore and aft pitching of loaded cars weighing upwards of 140,000 pounds (e.g., 63,500 kilograms) and lengths of 30 feet (e.g., 9.1 meters) with only two points of suspension can require significant design complexity and cost. Additionally, supporting such significant weight from only two points of suspension can require exceptional strength from the axle, wheels, and car body structure. To eliminate these problems, having more than two points of suspension on the twisting pair of rails may be desirable.

Unfortunately, having more than two points of suspension engaging a pair of twisting rails has limitations. In a two-point suspension system, the individual rigid car bodies are free to rotate per the lateral angle of the line that is perpendicular to and intersects both rails and the induced pitching is accommodated by the car to car couplers. In a greater than two point suspension system, during rotation the car body and axle wheel system must experience a lateral twist if all of the points of suspension are engaging the pair of rails. Additionally, if the points of suspension are not co-linear relative to the line that is perpendicular to the pair of rails, the pitch will also impart a longitudinal bend to the car body. The further apart the points of suspension are along the direction of the rails, the greater the amount of twist and bend that is imparted to the vehicle body. For illustrating the car body twisting, consider a twisting, roller-coaster with very long car bodies with two axles and wheels at both the front and back of each car. As a car body enters a short, quick twisting section of a rail pair, the front wheels will attempt to rotate the front of the vehicle but the back wheels are still on straight and level track resisting the twist. If the pair of tracks have a bending component as in a barrel roll or loop, and there are more than two points of suspension on either of the pair of rails, such as wheels attached to three axles, when the front axle wheels begin to move upward or downward, the rear two axle wheels resist the movement orthogonal to the pair of rails thereby imparting a bend to the car body. It is easy to see that this multi-point suspension system cannot work for long, rigid vehicle bodies with short, rapid twisting section of a pair of rails. The multi-point suspension system may work for the relationship of shorter car bodies or longer, milder twisting rails, where the vehicle body or wheel mounts are designed to accommodate enough twist and bend. Unfortunately, short vehicle bodies result in low tare to gross weight ratios and long, mild twisting sections of rail can require excessive real estate.

In one embodiment of the inventive subject matter described herein, systems and methods for continuous rotary dumping of rigid body vehicles with three or more points of suspension are provided. The points of suspension respectively engage and follow three or more twisting tracks to rotate or roll the vehicle to unload cargo being carried by the vehicle. Using the three or more points of suspension can avoid limitations on the length of the vehicle and/or the size of tracks, which are limitations of U.S. Pat. No. 4,889,605 described above. The twisting sections of the tracks can be as short and rapid as practical without requiring additional components for accounting for vehicle body twist or bend. The rotation of the vehicle is about a consistent, given axis to allow simple rotary couplings between a train of rigid body vehicles in one embodiment.

FIG. 1 is a side view of one embodiment of a rolling system 100. The system 100 is used to rotate vehicles 102 as the vehicles 102 move over a receptacle 104 in order to cause cargo 106 being carried by the vehicles 102 to be dumped or otherwise dispensed from the vehicles 102 into the receptacle 104. In one embodiment, the vehicles 102 represent rail vehicles, such as freight cars, that carry relative heavy amounts of cargo 106, such as dirt, minerals, grain, and the like. For example, the vehicles 102 may be freight cars that are either open along a top side of the cars or are capable of being opened so that the cargo 106 is dumped from the cars when the cars are rotated to one side. Alternatively, the vehicles 102 may represent another type of vehicle that carries cargo 106 and can dump the cargo 106 out of the vehicle when the vehicle is rotated. The receptacle 104 represents a container or area that is positioned to receive and at least temporarily store the cargo 106 when the vehicle 102 is rotated by the system 100.

The system 100 includes curved guide tracks 108, 110 (e.g., tracks 108A, 108B, 110A, 110B) that extend over the receptacle 104. The guide tracks 108, 110 are elongated and extend from proximate to (e.g., above) an input segment 112 of a route 114 to proximate to (e.g., above) an output segment 116 of the route 114. The route 114 may represent a track, such as a railroad track having one or more rails on which the vehicle 102 travels. Alternatively, the route 114 may represent another surface on which the vehicle 102 travels. The guide tracks 108, 110 may be suspended above the route 114 by one or more supports 118. The guide tracks 108, 110 extend over the receptacle 104 but the route 114 does not extend over at least a portion of the receptacle 104 such that the guide tracks 108, 110 support the vehicle 102 above the receptacle 104 when the vehicle 102 moves over the receptacle 104, as described below.

The input segment 112 of the route 114 includes the portion of the route 114 that leads the vehicle 102 toward the system 100 and the receptacle 104. For example, a vehicle 102 traveling on the input segment 112 of the route 114 along a direction of travel 120 will be directed to the system 100 and the receptacle 104. The output segment 116 of the route 114 includes the portion of the route 114 that leads the vehicle 102 away from the system 100 and the receptacle 104. For example, a vehicle 102 exiting the system 100 will travel on the output segment 116 of the route 114 and be directed away from the system 100 and the receptacle 104.

In the illustrated embodiment, the guide tracks 108 are vertically curved in upside down U-shapes. For example, the guide tracks 108 curve vertically upward and then downward in the direction of travel 120 of the vehicle 102. The guide tracks 110 are vertically curved in upright U-shapes in the illustrated embodiment. For example, the guide tracks 110 curve vertically downward and then upward in the direction of travel 120 of the vehicle 102. Alternatively, the guide tracks 108 and/or 110 may have a different shape. The term "vertically upward" refers to a direction that is generally oriented away from the receptacle 104 while the term "vertically downward" refers to a direction that is generally oriented toward the receptacle 104.

In the two-dimensional representation of the system 100 in FIG. 1, the guide tracks 108A, 110A and the guide tracks 108B, 110B may appear to combine before and after the guide tracks 108, 110 curve to form the U-shapes. But, the guide tracks 108A, 110A and the guide tracks 108B, 110B may remain separate from each other. For example, the guide tracks 108A, 110A may be disposed on opposite sides of the route 114 in the input and output segments 112, 116 of the route 114 and the guide tracks 108B, 110B may be disposed on opposite sides of the route 114 in the input and output segments 112, 116 of the route 114. The guide tracks 108A, 110A may remain separated from each other in the system 100 by a distance that is slightly larger than the width of the vehicle 102 so that the guide tracks 108A, 110A can engage guides 126 disposed on opposite sides 302, 304 (shown in FIG. 3) of the vehicle 102, as described below. The guide tracks 108B, 110B also may remain separated from each other in the system 100 by the same or similar distance.

Figure 2:
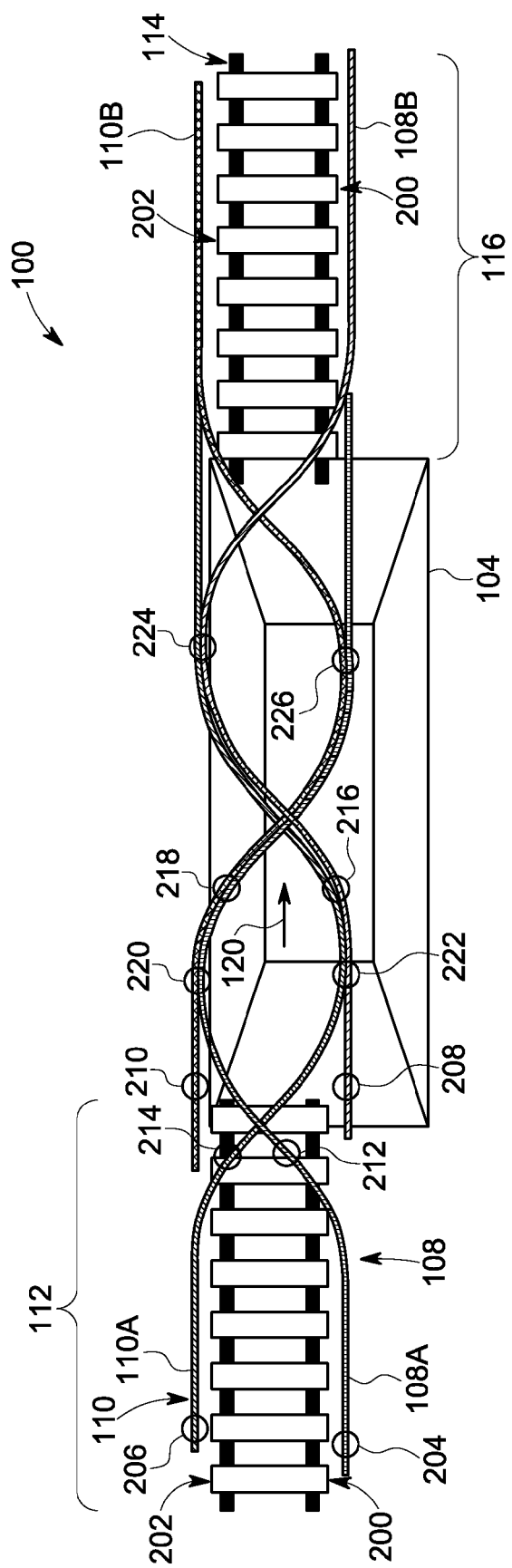
FIG. 2 is a top view of the rolling system shown in FIG. 1.

With continued reference to the system 100 shown in FIG. 1, FIG. 2 is a top view of the rolling system 100. The vehicle 102 is not shown in FIG. 2. In the illustrated embodiment, the guide tracks 108, 110 also are laterally curved in opposite lateral directions across the width of the route 114. For example, in addition to being vertically curved as shown and described in connection with FIG. 1, the guide tracks 108, 110 also may be laterally curved in U-shapes. From the perspective of FIG. 2, the guide tracks 108A, 108B are laterally curved in upside down U-shapes while the guide tracks 110A, 110B are laterally curved in upright U-shapes.

The illustrated guide tracks 108, 110 are disposed on opposite sides 200, 202 of the input segment 112 of the route 114. The guide tracks 108 curve laterally across the route 114 in the direction of travel 120 over at least a portion of the receptacle 104 from the side 200 of the route 114 toward the opposite side 202 of the route and then curve laterally back across the route 114 back toward the side 200. As shown in FIG. 2, the guide tracks 108 laterally curve back toward the side 200 of the route 114 in the output segment 116 of the route 114.

The guide tracks 110 curve laterally across the route 114 in the direction of travel 120 over at least a portion of the receptacle 104 from the side 202 of the route 114 in the input segment 112 toward the opposite side 202 of the route 114 and then curve laterally back across the route 114 toward the side 202. As shown in FIG. 2, the guide tracks 110 laterally curve back toward the side 202 of the route 114 in the output segment 116 of the route 114 such that the guide tracks 108, 110 are disposed on opposite sides 200, 202 of the route 144, respectively, in the output segment 116 of the route 114.

The guide tracks 108, 110 are shaped and positioned to engage the guides 126, 128 that are coupled with the vehicle 102. The guides 126, 128 represent bodies that are connected with the vehicle 102 or part of the vehicle 102. Examples of guides 126, 128 include, but are not limited to, pins, rollers, arms, and the like. The guides 126, 128 and guide tracks 108, 110 can have complementary shapes such that the guides 126, 128 are received in the guide tracks 108, 110 or otherwise engage the guide tracks 108, 110 such that movement of the guides 126, 128 is confined to movement along paths defined by the guide tracks 108, 110. For example, the guide tracks 108, 110 may define U or V shaped channels (or other shaped channels) that receive the guides 126, 128. Alternatively, the guide tracks 108, 110 may be received in the guides 126, 128. For example, the guide tracks 108, 110 may be rails have a circular cross-section for other shape) and the guides 126, 128 may define openings in which the rails are received.

The guides 126, 128 may be coupled to the opposite sides 300, 302 (shown in FIG. 3) of the vehicle 102. Only the side 300 of the vehicle 102 is visible in FIG. 1. As shown in FIG. 1, the guides 126, 128 are disposed at different heights in order for the guides 126, 128 to engage different guide tracks 108, 110. For example, the guide tracks 108B, 110B are disposed at larger heights than the guide tracks 108A, 110A. The heights of the guides 126, 128 may be determined with respect to a horizontal plane, such as the plane that is defined by the route, the parallel tracks of a route, or the like. The guides 126 engage the guide tracks 108A, 110A and are located at a lower height on the vehicle 102 than the guides 128 that engage the lower guide tracks 108B, 110B.

In the illustrated embodiment, the guides 126, 128 are located at or near different ends 132, 134 of the vehicle 102. For example, the guide 126 may be disposed closer to the end 132 of the vehicle 102 than the opposite end 134 and the guide 128 may be disposed closer to the end 134 of the vehicle 102 than the opposite end 132. The end 134 of the vehicle 102 may be referred to as a leading end of the vehicle 102 as the end 134 travels ahead of the opposite end 132 in the direction of travel 120.

The guides 126 engage the guide tracks 108A, 110A and the guides 128 engage the guide tracks 108B, 110B when the vehicle 102 travels in the direction of travel 120 into the system 100. The guide tracks 108A and 108B may be longitudinally spaced apart (e.g., in a direction that is parallel to or in the direction of travel 120) by a longitudinal separation distance 130 that is based on the separation between the guides 126, 128. Additionally, the guide tracks 110A and 110B may be longitudinally spaced apart by the separation distance 130. For example, the distance between the guides 126, 128 on each side 300, 302 of the vehicle 102 in the direction of travel 120, the longitudinal separation distance 130 between the guide tracks 108A and 108B, and the longitudinal separation distance 130 between the guide tracks 110A and 110B may be the same. The longitudinal separation distance 130 may be measured between common points on the guide tracks 108A, 108B and between common points on the guide tracks 110A, 110B, such as "vertical peaks" (e.g., portions of the guide tracks 108, 110 that are higher than other portions of the same guide tracks 108, 110 but not necessarily all portions), "vertical valleys" (e.g., portions of the guide tracks 108, 110 that are lower than other portions of the same guide tracks 108, 110 but not necessarily all portions), "lateral peaks" (e.g., portions of the guide tracks 108, 110 that extend farther to the side 202 of the route 114 than other portions of the same guide tracks 108, 110 but not necessarily all other portions), or "lateral valleys" (e.g., portions of the guide tracks 108, 110 that extend farther to the side 200 of the route 114 than other portions of the guide tracks 108, 110 but not necessarily all other portions) of the guide tracks 108, 110.

The guide tracks 108, 110 engage the guides 126, 128 of the vehicle 102 as the vehicle 102 moves in the direction of travel 120 in order to guide movement of the guides 126, 128 (and, as a result, the vehicle 102) along curved pathways defined by the guide tracks 108, 110. In the illustrated embodiment, the guide track 108A engages or is engaged by the guide 126 on the side 300 of the vehicle 102, the guide track 110A engages or is engaged by the guide 126 on the opposite side 302 of the vehicle 102, the guide track 108B engages or is engaged by the guide 128 on the side 300 of the vehicle 102, and the guide track 110B engages or is engaged by the guide 128 on the opposite side 302 of the vehicle 102.

The curved pathways defined by the guide tracks 108, 110 over the receptacle 104 translate movement of the vehicle 102 in the direction of travel 120 into rotation of the vehicle 102. For example, the vertical curvature (as shown in FIG. 1) and the lateral curvature (as shown in FIG. 2) of the guide tracks 108, 110 convert linear movement of the vehicle 102 in the direction of travel 120 into a rolling motion of the vehicle 102. This rolling motion of the vehicle 102 causes the vehicle 102 to dump or otherwise dispense the cargo 106 into the receptacle 104 when the vehicle 102 is disposed over the receptacle 104. The curved guide tracks 108, 110 can then convert continued movement of the vehicle 102 in the direction of travel 120 into a reverse rotation such that the vehicle 102 returns to an upright position by the time the vehicle 102 reaches the output segment 116 of the route 114. The vehicle 102 may then exit from the system 100 and travel along the route 114 with the cargo 106 being dispensed from the vehicle 102 to the receptacle 104 without having to stop the vehicle 102 over the receptacle 104.

Figure 3:
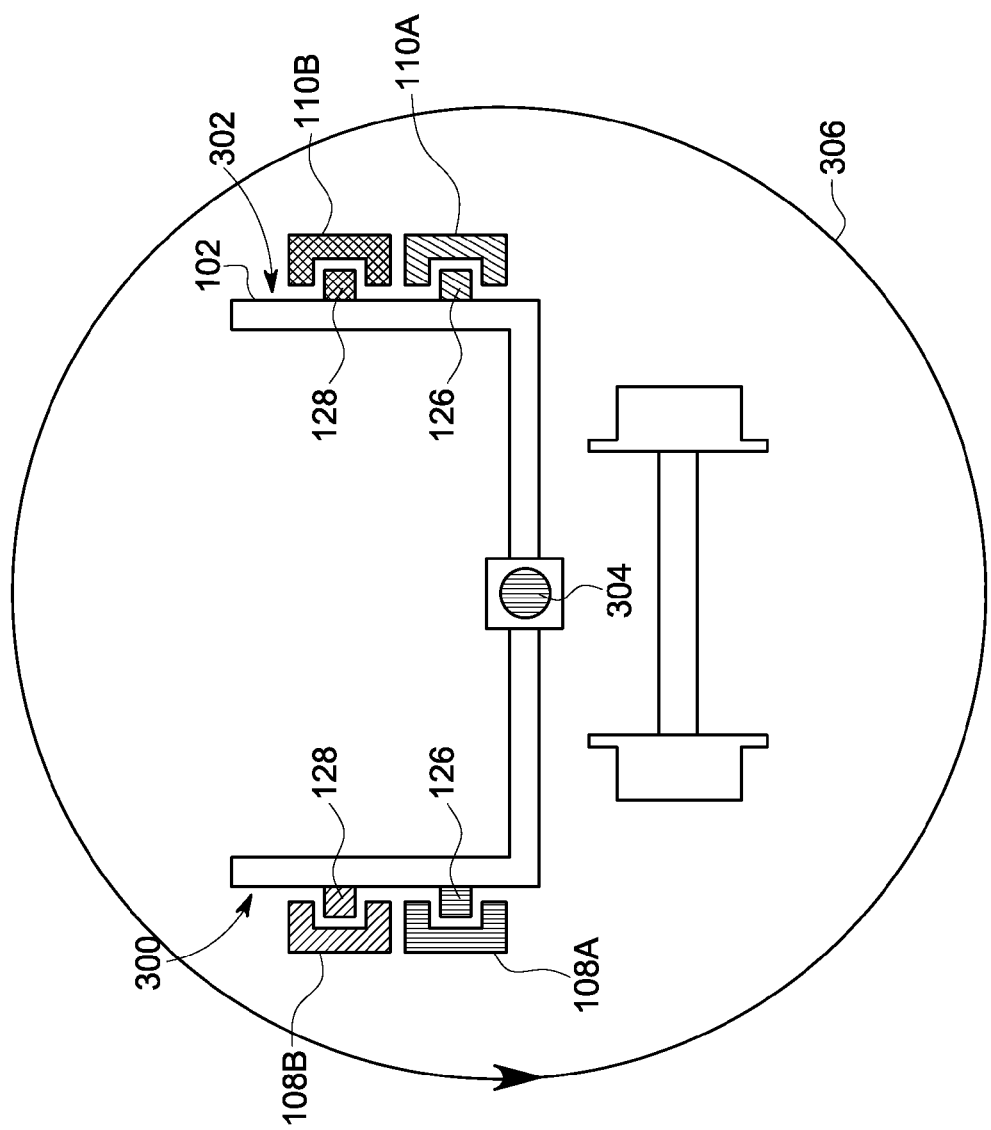
FIG. 3 illustrates a first schematic diagram of a vehicle shown in FIG. 1 as the vehicle moves through the system shown in FIG. 1 to dispense cargo from the vehicle in accordance with one embodiment.
Figure 4:
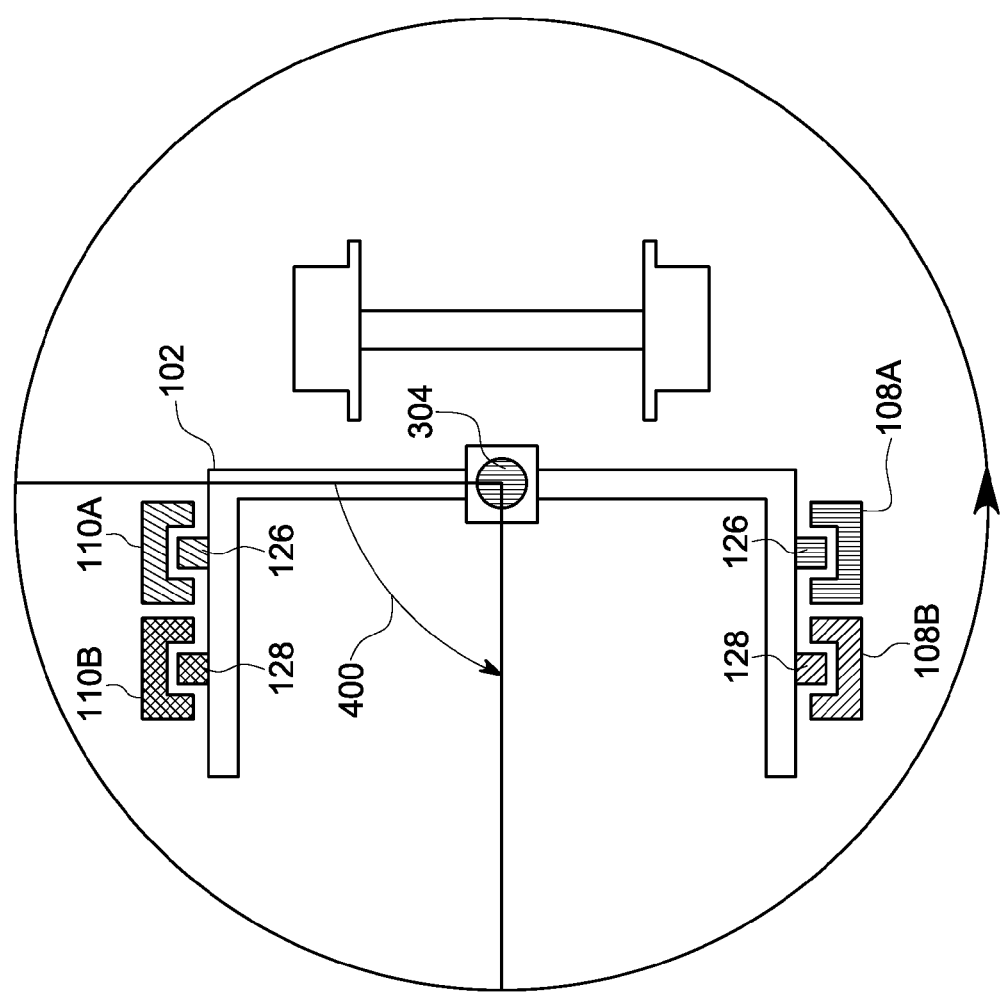
FIG. 4 illustrates a second schematic diagram of a vehicle shown in FIG. 1 as the vehicle moves through the system shown in FIG. 1 to dispense cargo from the vehicle in accordance with one embodiment.
Figure 5:
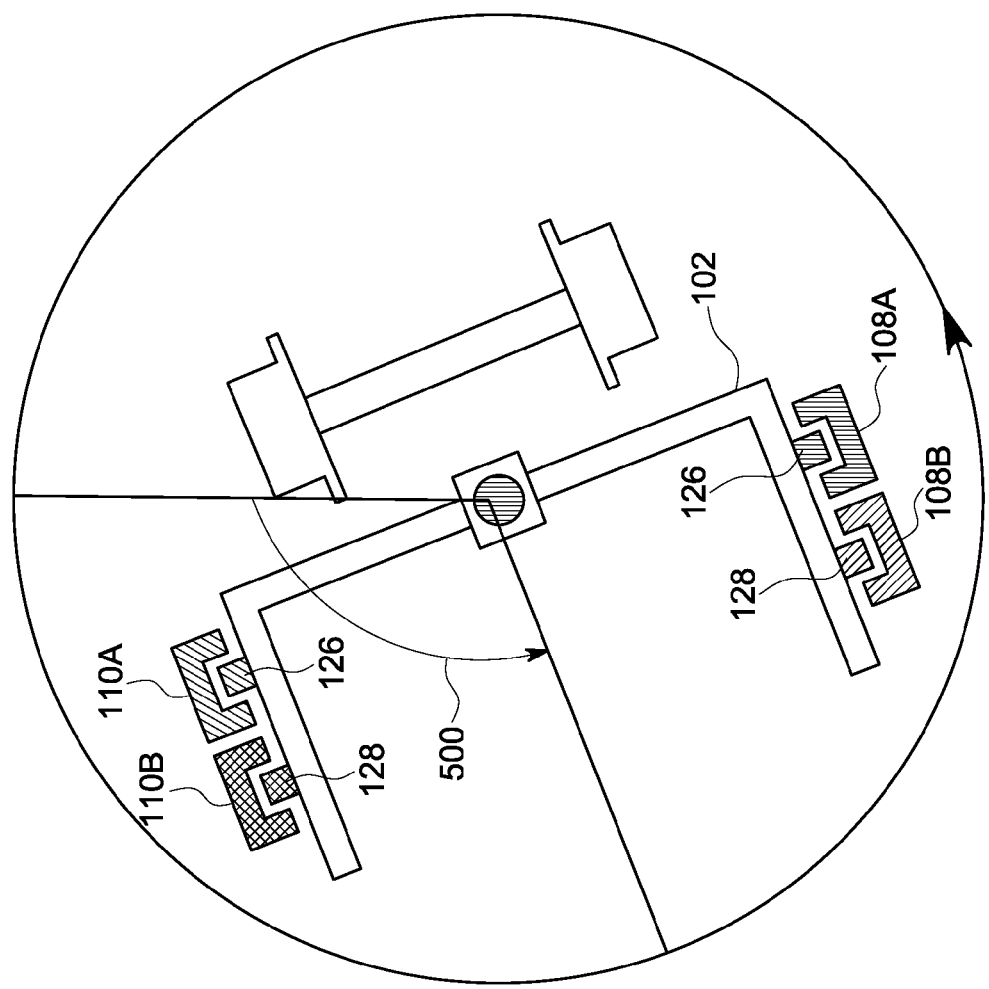
FIG. 5 illustrates a third schematic diagram of a vehicle shown in FIG. 1 as the vehicle moves through the system shown in FIG. 1 to dispense cargo from the vehicle in accordance with one embodiment.

FIGS. 3 through 5 illustrate schematic diagrams of the vehicle 102 as the vehicle 102 moves through the system 100 shown in FIG. 1 to dispense the cargo 106 shown in FIG. 1 from the vehicle 102 in accordance with one embodiment. The views of FIGS. 3 through 5 illustrate the guides 126, 128 on the opposite sides 300, 302 of the vehicle 102 being located at or in the same plane. As described above, however, the guides 128 may be disposed closer to the leading end 134 (shown in FIG. 1) of the vehicle 102 than the opposite trailing end 132 (shown in FIG. 1) of the vehicle 102 and the guides 126 may be disposed closer to the trailing end 132 than the leading end 134 of the vehicle 102.

The guide tracks 108, 110 translate linear movement of the vehicle 102 into rotation (or rotary movement 306) of the vehicle 102 about (e.g., around) an axis of rotation 304. The axis of rotation 304 may be coextensive with a direction of elongation of the vehicle 102 or parallel to the direction of elongation of the vehicle 102. The direction of elongation of the vehicle 102 represents the direction along which the vehicle 102 is longer than in one or more, or all, other dimensions.

The view of FIG. 3 illustrates the guides 126 engaged with the guide tracks 108A, 110A, the guides 128 engaged with the guide tracks 108B, 110B, and the vehicle 102 in an upright position. For example, with respect to FIG. 1, the view of FIG. 3 may correspond to the guides 126 engaged with the guide tracks 108A, 110A at a first location 136 along the guide tracks 108A, 110A and the guides 128 engaged with the guide tracks 108B, 110B at a second location 138 along the guide tracks 108B, 110B. With respect to FIG. 2, the view of FIG. 3 may correspond to the guide 126 on the side 300 of the vehicle 102 being engaged with the guide track 108A at a third location 204 in the system 100, the guide 126 on the side 302 of the vehicle 102 being engaged with the guide track 110A at a fourth location 206 along the guide track 110A, the guide 128 on the side 300 of the vehicle 102 engaged with the guide track 108B at a fifth location 208 along the guide track 108B, and the guide 128 on the side 302 of the vehicle 102 engaged with the guide track 110B at a sixth location 210 along the guide track 110B. The first location 136 shown in FIG. 1 may correspond to the third and fourth locations 204, 206 shown in FIG. 2 (and vice-versa) and the second location 138 may correspond to the fifth and sixth locations 208, 210 shown in FIG. 2 (and vice-versa).

As the vehicle 102 moves in the direction of travel 120 and the guides 126, 128 move along the curved pathways defined by the guide tracks 108, 110, the vehicle 102 rotates around the axis of rotation 304. FIG. 4 shows the vehicle 102 rotated by a first angle of rotation 400 from the upright position of the vehicle 102 shown in FIG. 3. With respect to FIG. 1, the view of FIG. 4 may correspond to the guide 126 on the side 300 of the vehicle 102 engaged with the guide track 108A at a seventh location 140 along the guide track 108A, the guide 126 on the opposite side 300 of the vehicle 102 engaged with the guide track 110A at an eighth location 142 along the guide track 110A, the guide 128 on the side 300 of the vehicle 102 engaged with the guide track 108B at a ninth location 144 along the guide track 108B, and the guide 128 on the side 302 of the vehicle 102 engaged with the guide track 110B at a tenth location 146 along the guide track 110B. With respect to FIG. 2, the view of FIG. 4 may correspond to the guide 126 on the side 300 of the vehicle 102 engaged with the guide track 108A at an eleventh location 212 along the guide track 108A, the guide 126 on the opposite side 300 of the vehicle 102 engaged with the guide track 110A at a twelfth location 214 along the guide track 110A, the guide 128 on the side 300 of the vehicle 102 engaged with the guide track 108B at a thirteenth location 216 along the guide track 108B, and the guide 128 on the side 302 of the vehicle 102 engaged with the guide track 110B at a fourteenth location 218 along the guide track 108B.

Continued movement of the vehicle 102 in the direction of travel 120 and the guides 126, 128 along the curved pathways defined by the guide tracks 108, 110 continues to advance rotation of the vehicle 102 around the axis of rotation 304.

FIG. 5 shows the vehicle 102 rotated by a second angle of rotation 500 from the upright position of the vehicle 102 shown in FIG. 3. The illustrated position of the vehicle 102 may represent the position at which the vehicle 102 dispenses (e.g., dumps) the cargo 106 (shown in FIG. 1) out of the vehicle 102 and into the receptacle 104. The angle of rotation 500 of the vehicle 102 that is generated by the system 100 can be controlled by modifying, the curvature of the guide tracks 108, 110. In one embodiment, the system 100 may cause rotation of the vehicle 102 by at least ninety degrees. In another embodiment, the system 100 may cause rotation of the vehicle 102 by at least one hundred twenty degrees.

With respect to FIG. 1, the view of FIG. 5 may correspond to the guide 126 on the side 300 of the vehicle 102 engaged with the guide track 108A at a fifteenth location 148 along the guide track 108A, the guide 126 on the opposite side 300 of the vehicle 102 engaged with the guide track 110A at a sixteenth location 150 along the guide track 110A, the guide 128 on the side 300 of the vehicle 102 engaged with the guide track 108B at a seventeenth location 152 along the guide track 108B, and the guide 128 on the side 302 of the vehicle 102 engaged with the guide track 110B at an eighteenth location 154. With respect to FIG. 2, the view of FIG. 5 may correspond to the guide 126 on the side 300 of the vehicle 102 engaged with the guide track 108A at a nineteenth location 220 along the guide track 108A, the guide 126 on the opposite side 300 of the vehicle 102 engaged with the guide track 110A at a twentieth location 222 along the guide track 110A, the guide 128 on the side 300 of the vehicle 102 engaged with the guide track 108B at a twenty-first location 224 along the guide track 108B, and the guide 128 on the side 302 of the vehicle 102 engaged with the guide track 110B at a twenty-second location 226 along the guide track 110B.

Figure 6:
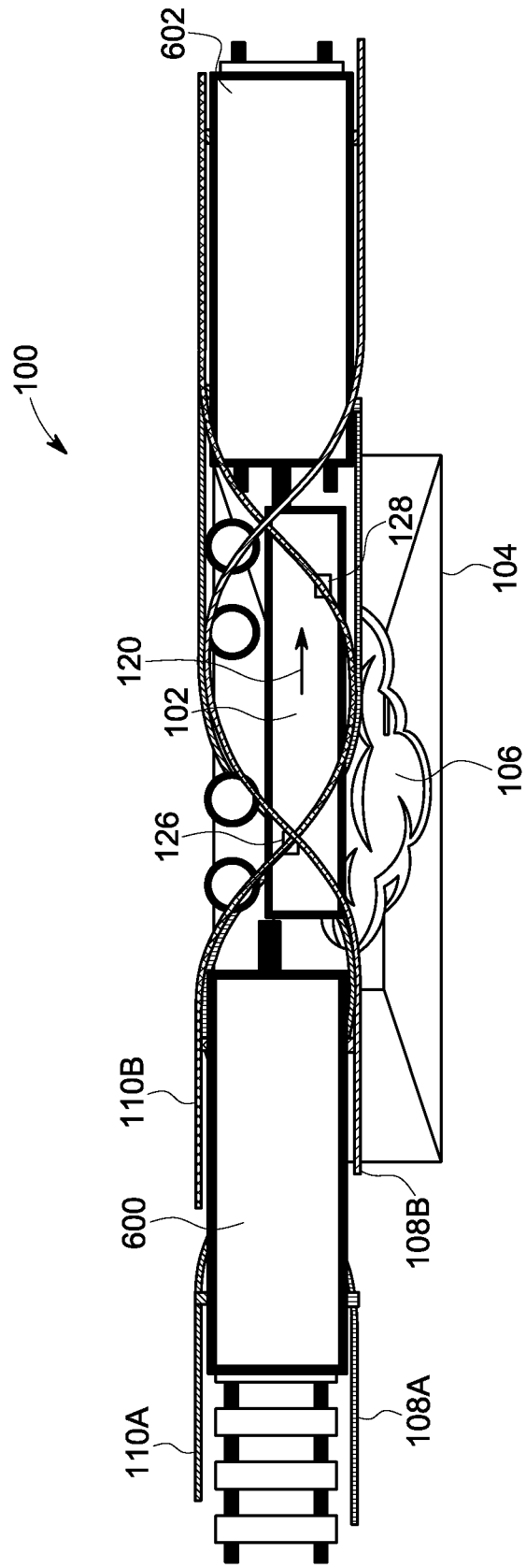
FIG. 6 is a top view of one embodiment of the system shown in FIG. 1 with the vehicle shown in FIG. 1 in a rotated position.

FIG. 6 is a top view of one embodiment of the system 100 with the vehicle 102 in a rotated position. The illustration shown in FIG. 6 shows the vehicle 102 rotated by the system 100 such that the cargo 106 is dispensed from the vehicle 102 into the receptacle 104. In the illustrated embodiment, the vehicle 102 is mechanically coupled with additional vehicles 600, 602 by coupler devices 604. The vehicles 600, 602 may be similar to the vehicle 102. For example, the vehicles 600, 602 may carry cargo 106 and include the guides 126, 128 that engage the guide tracks 108, 110 to convert movement of the vehicles 600, 602 in the direction of travel 120 into rotation of the vehicles 600, 602 above the receptacle 104. The coupler devices 604 between the vehicles 102, 600, 602 can permit the vehicle 102 to rotate relative to the vehicles 600, 602, as shown in FIG. 6.

The vehicle 102 can continue to move in the direction of travel 120 with the guides 126, 128 continuing to travel along the guide tracks 108, 110. The curved pathways defined by the track guides 108, 110 may cause the vehicle 102 to rotate and return to an upright position. For example, in one embodiment, the curved pathways defined by the track guides 108, 110 may be symmetric such that the vehicle 102 rotates in one direction up until the vehicle 102 is disposed over the receptacle 104 and then rotates an opposite direction as the vehicle 102 approaches the output segment 116 of the route 114. With respect to FIGS. 1 and 2, the curvature of the guide track 108A may be symmetric about the location 148 (which corresponds to the location 220 in FIG. 2) such that the curvature of the portion of the guide track 108A extending from the end located at or near the input segment 112 of the route 114 to the locations 148, 220 and the curvature of the portion of the guide track 108A extending from the locations 148, 220 to the opposite end located at or near the output segment 116 of the route 114 may be mirror images of each other. The guide track 108B may be symmetric about the location 152 (which corresponds to the location 224 in FIG. 2) such that the curvature of the portion of the guide track 108B extending from the end located at or near the input segment 112 of the route 114 to the locations 152, 224 and the curvature of the portion of the guide track 108B extending from the locations 152, 224 to the opposite end located at or near the output segment 116 of the route 114 may be mirror images of each other. Similarly, the curvature of the guide track 110A may be symmetric about the location 150 (which corresponds to the location 222 in FIG. 2) and the curvature of the guide track 110B may be symmetric about the location 154 (which corresponds to the location 226 in FIG. 2).

With respect to the views shown in FIGS. 3 through 5, the guide tracks 108, 110 may cause the vehicle 102 to rotate in a first direction (e.g., counter-clockwise direction) when the vehicle 102 moves from the input segment 112 of the route 114 to a position over the receptacle 104. As described above, when the vehicle 102 is at this position, the guides 124 may be located at the location 148, 220 along the guide track 108A and the location 150, 222 along the guide track 110A and the guides 128 may be located at the location 152, 226 along the guide track 108B and the location 154, 224 along the guide track 110B. When the vehicle 102 moves past this position toward the output segment 116 of the route 114, the guides 124, 128 continue to move along the curved pathways defined, by the guide tracks 108, 110 such that the vehicle 102 rotates in an opposite direction. With respect to FIGS. 3 through 5, the guide tracks 108, 110 may cause the vehicle 102 to rotate in an opposite, second direction (e.g., clockwise direction). The guide tracks 108, 110 can cause the vehicle 102 to return to the upright position shown in FIG. 3 before the vehicle 102 exits the system 100 and continues along the output segment 116 of the route 114.

The vehicles 102, 600, 602 can sequentially move through the system 100 to cause the vehicles 102, 600, 602 to move from upright positions to rotated positions (where the cargo 106 is dumped from the vehicles 102, 600, 602), and then back to the upright positions. In one embodiment, the system 100 rotates the vehicles 102, 600, 602 without moving the system 100 relative to the route 114. For example, the system 100 may remain stationary with respect to the route 114, the surface that the route 114 is located on (e.g., the ground), and/or the receptacle 104 while the vehicles 102, 600, 602 move through and are rotated by the system 100.

In one embodiment, the system 100 translates the movement of the vehicle 102 in the direction of travel 120 over the receptacle 104 into the rolling motion of the vehicle 102 that rotates the vehicle 102 around the axis of rotation 304 without twisting the vehicle 104. For example, using multiple guides 126, 128 coupled to the vehicle 102 in several locations (e.g., at or near the opposite ends 132, 134 of the vehicle 102 and/or on the opposite sides 300, 302 of the vehicle 102) can allow for the different guide tracks 108, 110 to concurrently move the multiple guides 126, 128 in the spaced apart locations on the vehicle 102 along complementary curved paths so that the vehicle 102 is not twisted during the rotation. By "not twisted," it is meant that the shape of the vehicle 102 is not bent, distorted, or otherwise altered (e.g., the shape or cross-section of the vehicle 102 is not changed) during rotation of the vehicle 102 by the system 100.

The system 100 translates the movement of the vehicle 102 in the direction of travel 120 into a rolling motion while also rotating the wheels, axles, bogies, and the like, of the vehicle 102. For example, the vehicle 102 may be a rail car that rides on bogies having axles and/or wheels. The bogies may not be captured to the vehicle 102 and/or the axles may not be captured to the bogies. By not being "captured," it is meant that the bogies and/or axles are not connected with the vehicle 102 in such a way that when the weight of the vehicle 102 is removed from the bogies or axles (as could occur when the vehicle 102 is rotated as described above), the portion of the vehicle 102 that carries the cargo 106 may be separated from the bogies and/or the axles may separate from the bogies. The vehicle 102 may include one or more assemblies that prevent such separation when the vehicle 102 is rotated so that the vehicle 102, bogies, and axles are all rotated by the system 100.

Figure 7:
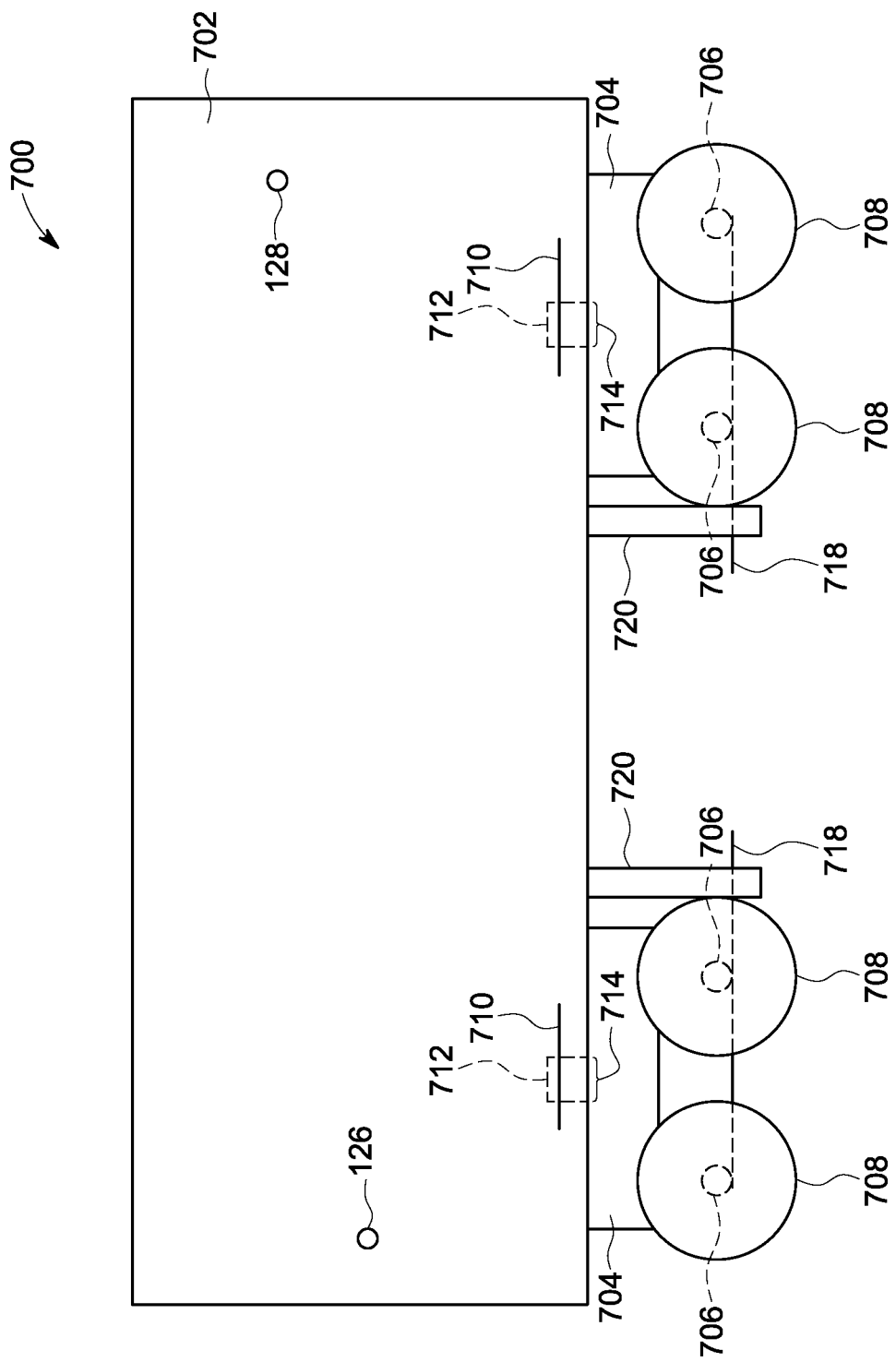
FIG. 7 illustrates one embodiment of a vehicle that may be used with the system shown in FIG. 1.

FIG. 7 illustrates one embodiment of a vehicle 700 that may be used with the system 100. The vehicle 700 may represent one or more of the vehicles 102, 600, 602 shown in FIGS. 1 and 6. The vehicle 700 includes a container 702 that holds the cargo 106 (shown in FIG. 1). In the illustrated embodiment, the container 702 represents a five sided chamber, but alternatively may represent another chamber that can hold the cargo 106. As described above, the vehicle 700 can include guides 126, 128 that engage the guide tracks 108, 110 (shown in FIG. 1) to translate linear movement of the vehicle 700 into a rolling motion to dump the cargo 106 from the vehicle 700 into the receptacle 104 (shown in FIG. 1).

The container 702 of the vehicle 700 rests on bogies 704. The bogies 704 represent chassis connected with axles 706 of the vehicle 702. The axles 706 are connected with wheels 708 that engage and roll on the route 114 when the vehicle 700 moves along the route 114. The bogies 704 may be secured to the container 702 (or other component of the vehicle 700) by removable pins 710.

Extensions 712 of the bogies 704 may extend into the vehicle 700 through openings 714 in the vehicle 700. These extensions 712 may include openings 716 that receive the pins 710 to secure the bogies 704 to the container 702. For example, the pins 710 may be longer than the width of the opening 714 through which the extensions 712 extend. As a result, when the pins 710 are inserted into the openings 714 in the vehicle 700, lifting or other separation of the container 702 will not result in the bogies 704 from being disconnected from the vehicle 700. For example, when the vehicle 700 is rotated by the system 100 (shown in FIG. 1), the rotation of the vehicle 700 will not result in the bogies 704 separating from the vehicle 700. If the bogies 704 need to be removed from the vehicle 700 (e.g., for servicing or replacement), the pins 710 can be removed and the container 702 can be lifted to separate the container 702 from the bogies 704. In another embodiment, devices other than the pins 710 can be used to secure the bogies 704 to the vehicle 700.

The bogies 704 may rest on the axles 706 such that the bogies 704 and the container 702 are supported by the axles 706. Downwardly extending securing members 716 may extend down from the vehicle 700 to receive removable pins 718. Alternatively, the members 716 may extend downward from the bogies 704. In the illustrated embodiment, the members 716 extend downward sufficiently far such that the members 716 are closer to the surface on which the wheels 708 roll (e.g., the route 114) than the axles 706.

The members 716 receive the pins 718 to prevent the axles 706 from separating from the bogies 704. For example, the members 716 may include openings that receive the pins 718 in a location that causes the pins 718 to be located between the axles 706 and the surface on which the wheels 708 roll (e.g., the route 114). The pins 718 may engage the axles 706 or be spaced apart from the axles 706. While only a single member 716 and pin 718 are shown for each bogie 704, alternatively, multiple members 716 and/or pins 718 may be provided.

When the pins 718 are inserted into the members 716, lifting or other separation of the container 702 will not result in the axles 706 separating from the bogies 704. For example, when the vehicle 700 is rotated by the system 100, the rotation of the vehicle 700 will not result in the axles 706 separating from the bogies 704. If the axles 706 need to be removed from the vehicle 700 (e.g., for servicing or replacement), the pins 718 can be removed and the container 702 and bogies 704 can be lifted to separate the axles 706 from the bogies 704. In another embodiment, devices other than the members 716 and/or the pins 718 can be used to secure the axles 706 to the bogies 704.

Figure 8:
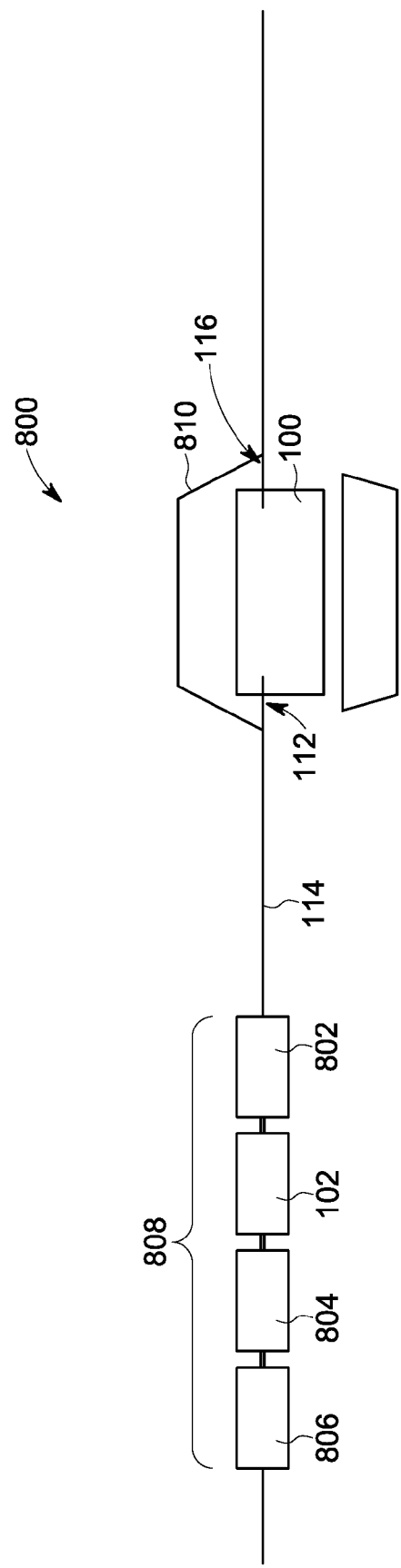
FIG. 8 is a schematic diagram of a portion of a transportation network that includes the system shown in FIG. 1 in accordance with one embodiment.

FIG. 8 is a schematic diagram of a portion of a transportation network 800 that includes the system 100 shown in FIG. 1 in accordance with one embodiment. The system 100 is schematically illustrated in FIG. 8. As described above, the vehicle 102 may be included in a vehicle consist 808 that includes one or more additional vehicles 802, 804, 806 mechanically coupled with each other. Additional vehicles may be coupled with the vehicles 102, 802, 804, 806. As one example, the vehicle 102 may be a rail car that is connected with one or more locomotives and/or other rail vehicles in a train. For example, the vehicles 802 and 806 may be powered vehicles e.g., leading and trailing locomotives, respectively) that generate tractive effort to propel the vehicle consist 808 along the route 114. The terms "leading" and "trailing" are used to indicate an order along a direction of travel of the consist 808 and are not intended as assigning priority between the vehicles in the consist 808.

Not all of the vehicles 102, 802, 804, 806 in the consist 800 may need to be rotated by the system 100 in order to dump cargo 106 (shown in FIG. 1) into the receptacle 104. For example, the powered vehicles 802, 806 may not carry cargo that is to be dumped into the receptacle 104. One or more of the vehicles 102, 804 may not be carrying cargo that is to be dumped into the receptacle 104. In order to continue traveling through the transportation network 800 without moving such vehicles through the system 100, the system 100 includes a bypass segment 810 of the route 114. The bypass segment 810 is a portion of the route 114 that is coupled with the input segment 112 and the output segment 116 of the route 114 and that extends around the guide tracks 108, 110 (shown in FIG. 1).

In order to avoid traveling through the guide tracks 108, 110 of the system 100. One or more of the vehicles in the consist 808 can decouple from the consist 800 and take the bypass route 810 to travel around the guide tracks 108, 110. These vehicles can then couple with the consist 808 when the vehicles that do travel through the system 100 and are rotated by the guide tracks 108, 110 so that the consist 808 can continue traveling along the route 114 from the output segment 116 of the route 114.

Figure 9:
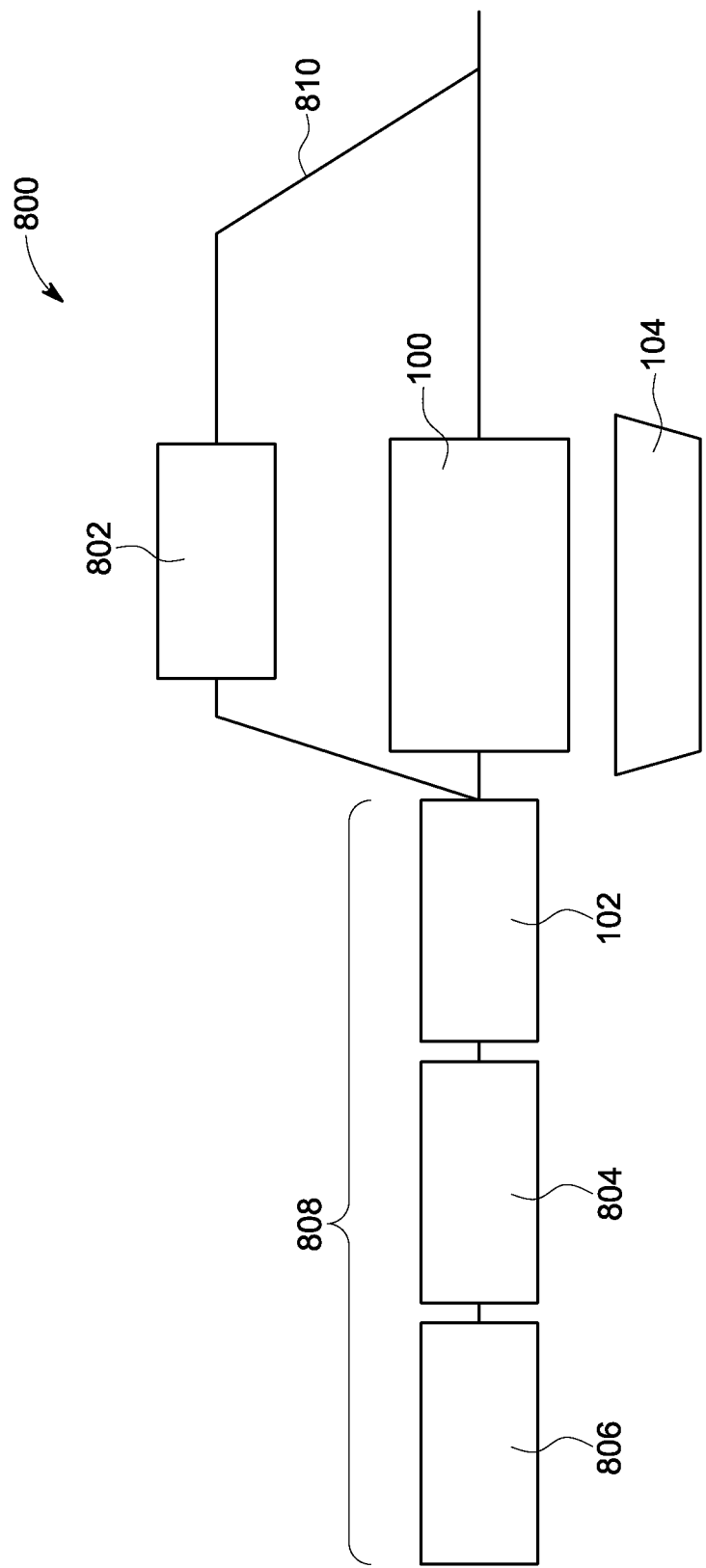
FIG. 9 provides a first illustration showing one example of how a vehicle in a vehicle consist shown in FIG. 8 can travel around guide tracks of the system shown in FIG. 1.
Figure 10:
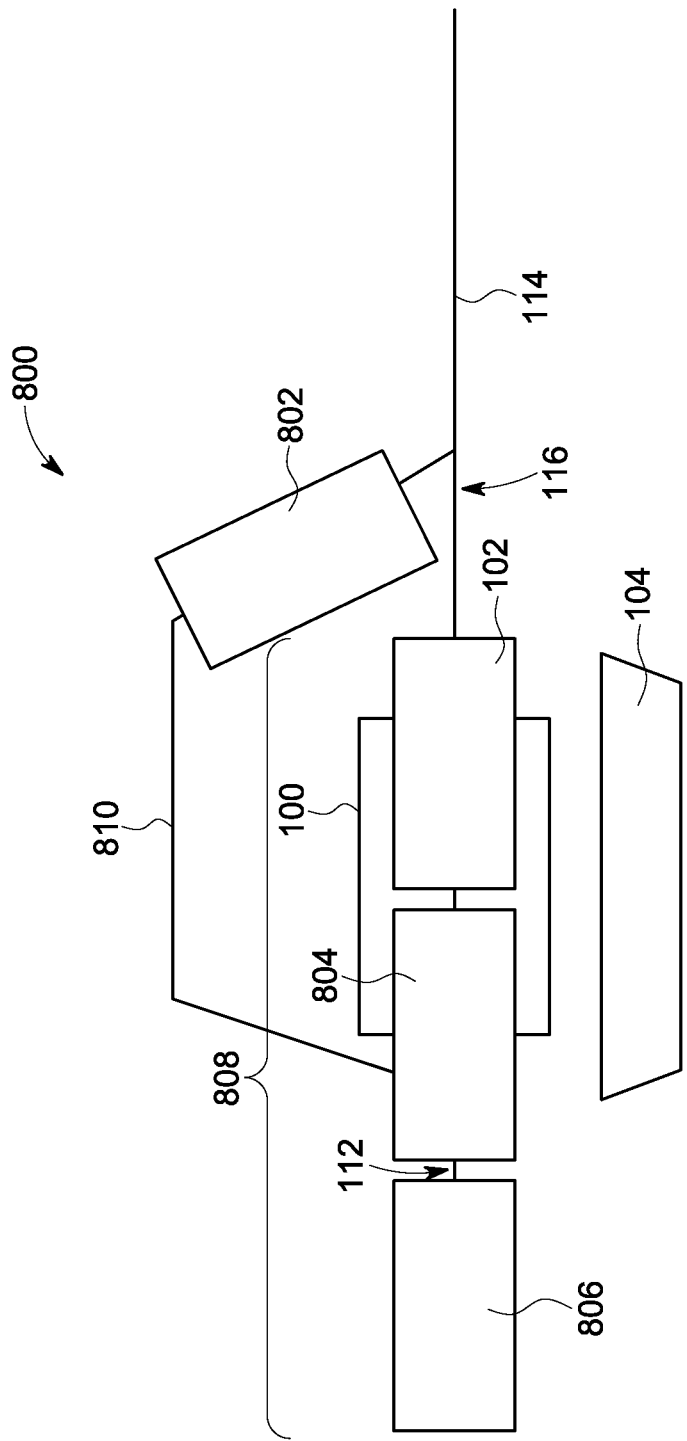
FIG. 10 provides a second illustration showing one example of how a vehicle in a vehicle consist shown in FIG. 8 can travel around guide tracks of the system shown in FIG. 1.
Figure 11:
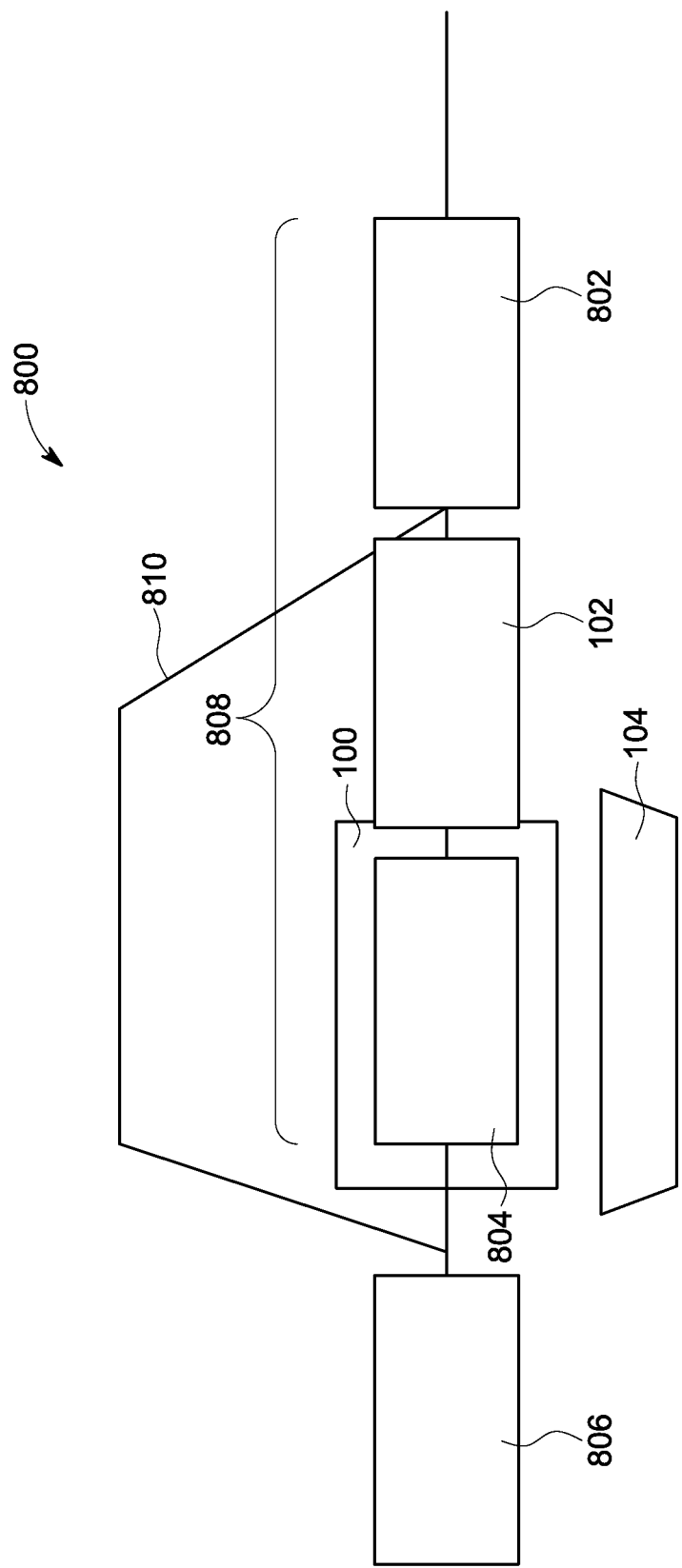
FIG. 11 provides a third illustration showing one example of how a vehicle in a vehicle consist shown in FIG. 8 can travel around guide tracks of the system shown in FIG. 1.

FIGS. 9 through 11 illustrate one example of how a vehicle in the consist 808 can travel around the guide tracks 108, 110 (shown in FIG. 1) of the system 100. The discussion of FIGS. 9 through 11 describes the vehicle 802 as being a leading powered vehicle (e.g., a leading locomotive), the vehicles 102, 804 as being vehicles that carry cargo 106 (shown in FIG. 1), and the vehicle 806 as being a trailing powered vehicle (e.g., a trailing locomotive). In FIG. 9, the leading powered vehicle 802 separates from the consist 808 and travels around the guide tracks 108, 110 of the system 100 along the bypass route 810. One or more switches may connect the bypass segment 810 with the route 114 upstream (in the direction of travel of the vehicle consist 808) of the input segment 112 of the route 114. The switches can be actuated to direct the leading powered vehicle 802 onto the bypass segment 810 once the leading powered vehicle 802 is decoupled from the vehicle consist 808. The trailing powered vehicle 806 can then continue to push the vehicle consist 808 onto the input segment of the route 114 toward the guide tracks 108, 110 of the system 100.

In FIG. 10, the trailing powered vehicle 806 pushes the vehicle 102 into and through the guide tracks 108, 110 of the system 100 to rotate and dump the cargo 106 from the vehicle 102, as described above. The leading powered vehicle 802 continues to move around the guide tracks 108, 110 and back toward the route 114 at an intersection between the bypass segment 810 and the route 114 downstream of the output segment 116 of the route 114 in the direction of travel of the vehicle consist 808. The trailing powered vehicle 806 can continue to push the vehicle 102 or both the vehicles 102, 804 through and along, the guide tracks 108, 110 of the system 100 (as described above) and onto the output segment 116 of the route 114. In one embodiment, the trailing powered vehicle 806 pushes the vehicle 102 sufficiently far onto the output segment 116 of the route 114 that the leading, powered vehicle 802 can reconnect with the consist 808.

In FIG. 11, the leading powered vehicle 802 moves from the bypass segment 810 of the route 114 and onto the route 114 downstream of the system 100 in the direction of travel of the vehicle consist 808. One or more switches at an intersection between the bypass route 810 and the route 114 downstream of the system 100 may be actuated to allow the leading powered vehicle 802 to move from the bypass segment 810 to the route 114. These switches may then be actuated to allow the vehicles 102, 804 to travel from the output segment 116 of the route 114 onto the route 114 downstream of the output segment 116 without traveling onto the bypass route 810. The leading powered vehicle 802 can reconnect with the vehicle consist 808, in one embodiment, the leading powered vehicle 802 can pull one or more of the vehicles 804 of the vehicle consist 808 through the guide tracks 108, 110 of the system 100 to dump cargo 106 into the receptacle 104, as described above.

The trailing powered vehicle 806 can disconnect from the vehicle consist 808 and travel on the bypass segment 810. The leading powered vehicle 802 can pull the vehicle consist 808 sufficiently far to allow the trailing powered vehicle 806 to reconnect with the vehicle consist 808 (e.g., with the trailing end of the vehicle 804) when the trailing powered vehicle 806 bypasses the guide tracks 108, 110 and returns to the route 114 downstream of the system 100. The reconstituted vehicle consist 808 may then continue along the route 114 with the cargo 106 having been dumped from the vehicles 102, 804 into the receptacle 104.

Figure 12:
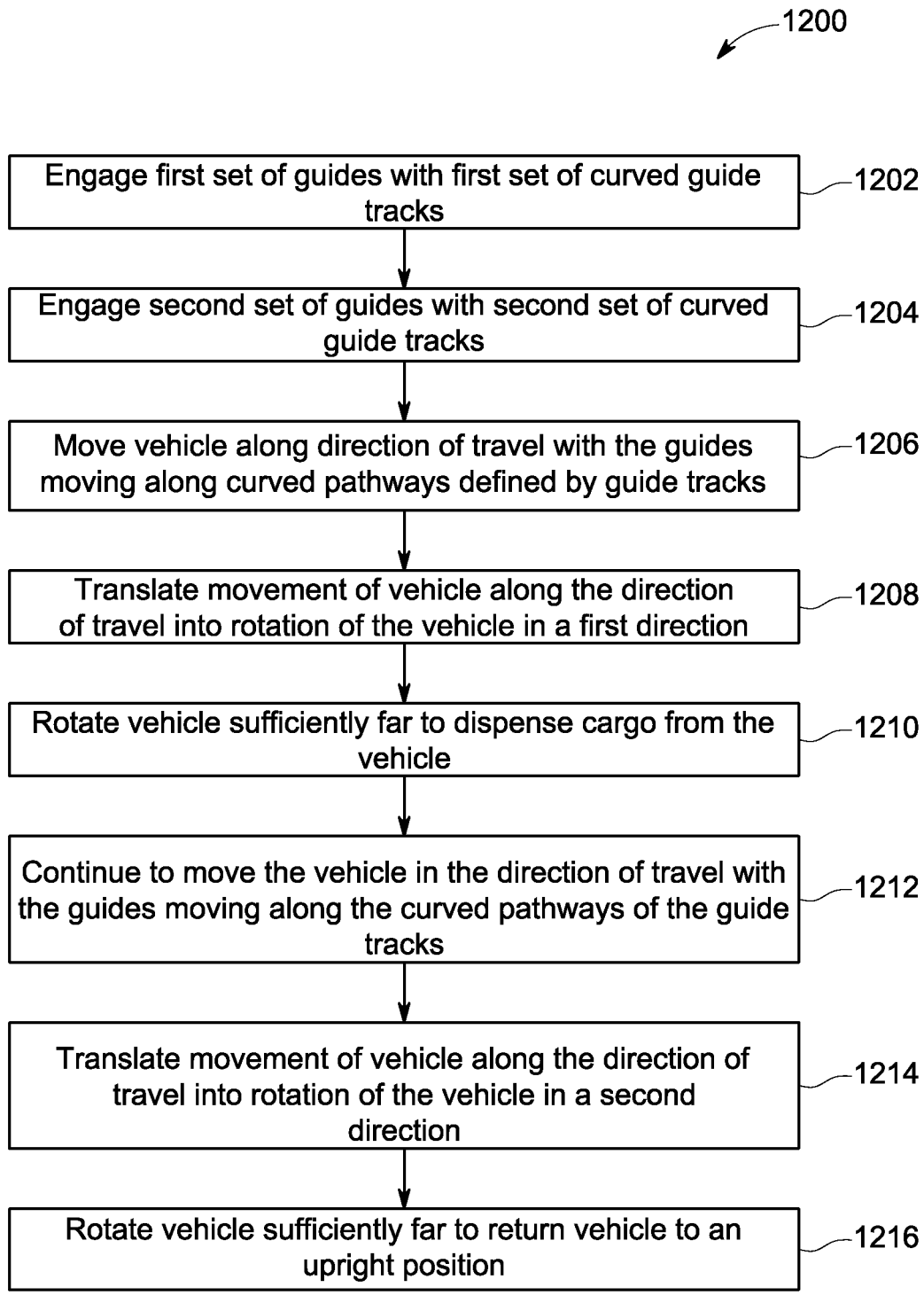
FIG. 12 is a flowchart of one embodiment of a method for rolling a vehicle to unload cargo from the vehicle.

FIG. 12 is a flowchart of one embodiment of a method 1200 for rolling a vehicle to unload cargo from the vehicle. The method 1200 may be used in conjunction with one or more embodiments of the system 100 (shown in FIG. 1). For example, the method 1200 may be used to translate movement of the vehicle 102 (shown in FIG. 1) in the direction of travel 120 (shown in FIG. 1) into a rolling motion in order to dump cargo 106 (shown in FIG. 1) into the receptacle 104 (shown in FIG. 1) disposed below the system 100.

At 1202, a first set of guides of the vehicle engage a first set of laterally and vertically curved guide tracks. The first set of guides can include a single guide or multiple guides. As described above, the guides 128 (shown in FIG. 1) may engage the guide tracks 108B, 110B (shown in FIG. 1).

At 1204, a second set of guides of the vehicle engage a second set of laterally and vertically curved guide tracks. The second set of guides can include a single guide or multiple guides. As described above, the guides 126 (shown in FIG. 1) may engage the guide tracks 108A, 110A (shown in FIG. 1).

In one embodiment, the first and second set of guides on the vehicle may engage the first and second sets of guide tracks at the same time. For example, the first and second sets of guide tracks may be longitudinally spaced apart in the direction of travel of the vehicle by an equivalent distance as the longitudinal spacing between the first and second sets of guides on the vehicle. Alternatively, the first set of guides or the second set of guides may engage the corresponding first set of guide tracks or the second set of guide tracks before the other set of guides.

At 1206, the vehicle moves along a direction of travel with the guides of the vehicle moving along vertically and laterally curved pathways that are defined by the guide tracks. For example, the guide tracks may define channels in which the guides are constrained to move as the vehicle moves in the direction of travel over the receptacle. The vehicle may be pushed or pulled by a powered vehicle, such as a locomotive.

At 1208, the guide tracks translate the linear movement of the vehicle into rotation of the vehicle in a first direction. For example, the guide tracks 108, 110 may be curved in both lateral and vertical directions from the input segment 112 of the route 114 to a location above the receptacle 104. The movement of the vehicle 102 in the direction of travel 120 causes the guides 126, 128 to follow the curved pathways defined by the guide tracks 108, 110, which translates the movement of the vehicle 102 into rotation of the vehicle 102 in a first direction (e.g., clockwise or counter-clockwise).

At 1210, the vehicle continues to be rotated sufficiently far such that the vehicle dispenses cargo into the receptacle. For example, the vehicle 102 may continue to move in the direction of travel 120 with the guide tracks 108, 110 translating this movement into rotation of the vehicle 102 until the vehicle 102 is disposed above the receptacle 104. In one embodiment, the vehicle 102 may be rotated at least ninety degrees. In another embodiment, the vehicle 102 may be rotated at least one hundred twenty degrees. In another embodiment, the vehicle 102 may be rotated at least one hundred thirty-five degrees. In yet another embodiment, the vehicle 102 may be rotated another distance. This rotation of the vehicle 102 can cause the cargo 106 to fall out of or be otherwise dumped from the vehicle 102 into the receptacle 104, as described above.

At 1212, the vehicle continues to move in the direction of travel after dispensing the cargo. For example, the vehicle 102 can continue to move in the direction of travel 120 with the guides 126, 128 following the curved pathways of the guide tracks 108, 110.

At 1214, the guide tracks translate the linear movement of the vehicle into rotation of the vehicle in a second direction. For example, the guide tracks 108, 110 may be curved in both lateral and vertical directions from positions above the receptacle 104 to the output segment 116 of the route 114. The curvature of the guide tracks 108, 110 can translate the movement of the vehicle 102 in the direction of travel to rotation of the vehicle 102 in a direction that is opposite of the direction of rotation used to rotate the vehicle 102 to a dispensing position above the receptacle 104. For example, at 1208, the vehicle 102 may be rotated in a first direction (e.g., clockwise or counter-clockwise) to position the vehicle 102 above the receptacle 104 and the dump the cargo 106 from the vehicle 102 into the receptacle 104. At 1214, the vehicle 102 may be rotated in an opposite second direction (e.g., counter-clockwise or clockwise) to return the vehicle 102 toward an upright position.

At 1216, the vehicle continues to be rotated sufficiently far such that the vehicle returns to an upright position. For example, the vehicle 102 may continue to move in the direction of travel 120 with the guide tracks 108, 110 translating this movement into rotation of the vehicle 102 until the vehicle 102 is positioned to resume travel along the route 114. In one embodiment, the vehicle 102 may be rotated to the same orientation as the vehicle 102 had when the vehicle 102 entered the guide tracks 108, 110 on an opposite side of the guide tracks 108, 110.

FIGS. 13 through 16 illustrate top views of a rolling system 1300 in accordance with another embodiment. The rolling system 1300 may be similar to the rolling system 100 (shown in FIG. 1) in that the rolling system 1300 includes curved guide tracks 1308, 1310 that translate movement of a vehicle 1302, such as the vehicle 102 (shown in FIG. 1), into a rolling motion or movement of the vehicle 1302, similar to as described above. One difference between the systems 100, 1300 is that the rolling system 1300 includes three guide tracks 1308A, 1308B, 1310 instead of the four guide tracks 108, 110 shown in the illustrated embodiment of the system 100 in FIGS. 1 through 6. In another embodiment, the rolling system 100 and/or 1300 may include a different number of guide tracks, such as more than five guide tracks.

In the illustrated embodiment, the guide tracks 1308, 1310 are curved in opposite directions across a route 1314 (which may be similar to the route 114 shown in FIG. 1), similar to the guide tracks 108, 110. The guide tracks 1308, 1310 are disposed on opposite lateral sides of an input segment 1312 of the route 1314. The guide tracks 1308 curve laterally across the route 1314 over the receptacle 104 from a first lateral side of the route 1314 toward the opposite second lateral side of the route 1314 and then curve laterally back across the route 1314 toward the first lateral side. The guide track 1310 curves laterally across the route 1314 over at least a portion of the receptacle 104 in an opposite direction than the guide tracks 1308.

Figure 13:
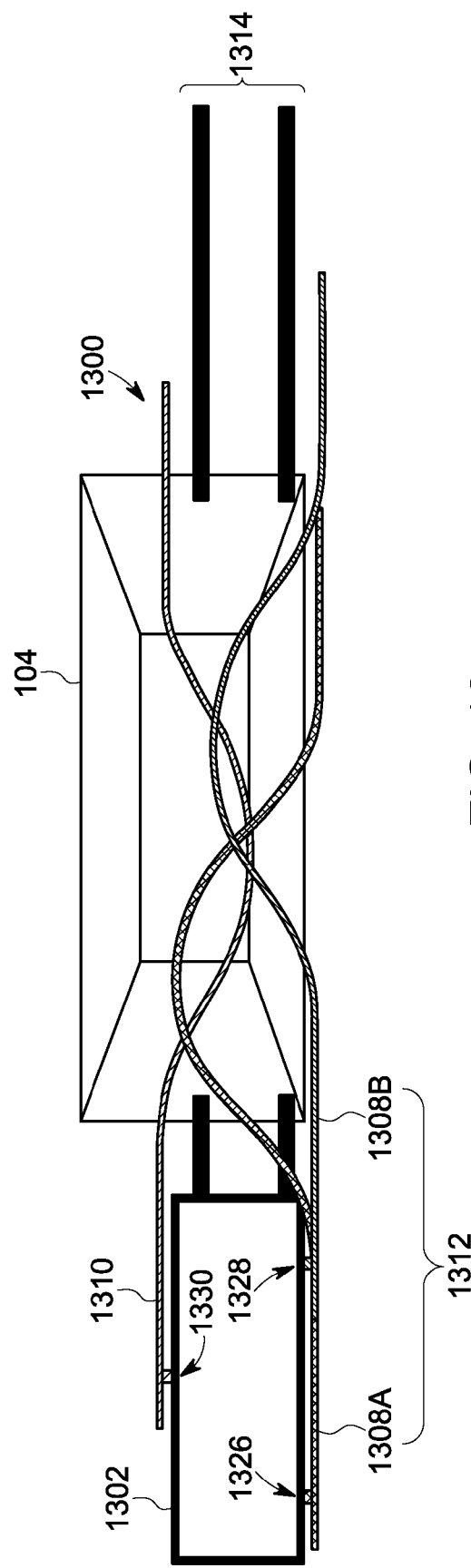
FIG. 13 illustrates a top view of a rolling system in accordance with another embodiment.

The guide tracks 1308, 1310 are shaped and positioned to engage guides 1326, 1328, 1330 that are coupled with the vehicle 1302. The guides 1326, 1328, 1330 may be similar to the guides 126, 128 (shown in FIG. 1). The guides 1326, 1328 may be coupled to a first lateral side of the vehicle 1302, while the guide 1330 may be coupled to the opposite, second lateral side of the vehicle 1302. For example, of the three guides 1326, 1328, 1330 that are connected to the vehicle 1302, two are located on one lateral side while the remaining guide is located on the opposite lateral side. As shown in FIG. 13, two of the guides 1326, 1328 are located on the same side of the vehicle 1302 as the two guide tracks 1308A, 1308B while the single guide 1330 is located on the same side of the vehicle 1302 as the guide track 1310.

In one embodiment, the guide 1326 may be similar to the guide 126 while the guide 1328 may be similar to the guide 128. For example, the guide 1326 may be disposed closer to a leading end (e.g., the front end) of the vehicle 1302 in the direction of travel of the vehicle 1302 while the guide 1328 is disposed closer to a trailing end (e.g., the back end) of the vehicle 1302 in the direction of travel of the vehicle 1302. In the illustrated embodiment, the guide 1330 is disposed approximately in the middle of the vehicle 1302 along the length of the vehicle 1302. Alternatively, the guide 1330 may be disposed closer to the front or back end of the vehicle 1302.

The guides 1326, 1328, 1330 may be disposed at various vertical heights on the sides of the vehicle 1302. For example, the guide 1326 may be vertically disposed lower (e.g., closer to the route 1314) than the guide 1328. The guide 1330 may be vertically disposed at the same or different location e.g., height) than the guide 1326 and/or the guide 1328.

Similar to the system 100, the guides 1326, 1328 engage the guide tracks 1308A, 1308B and the guide 1330 engages the guide track 1310 when the vehicle 102 travels in the direction of travel into the system 1300. The guide tracks 1308A and 1308B are longitudinally spaced apart by a longitudinal separation distance that is based on the separation between the guides 1326, 1328, similar to as described above in connection with the guide tracks 108, 110 and the guides 126, 128.

The guide tracks 1308, 1310 engage the guides 1326, 1328, 1330 of the vehicle 1302 as the vehicle 1302 moves in the direction of travel in order to direct movement of the guides 1326, 1328, 1330 (and, as a result, the vehicle 1302) along the curved pathways that are defined by the guide tracks 1308A, 1308B, 1310. In the illustrated embodiment, the guide track 1308A engages or is engaged by the guide 1326, the guide track 1310 engages or is engaged by the guide 1330 on the opposite side of the vehicle 1302, and the guide track 1308B engages or is engaged by the guide 1328. The curved pathways defined, by the guide tracks 1308, 1310 over the receptacle 104 translate movement of the vehicle 1302 in the direction of travel into rotation of the vehicle 1302. For example, the vertical curvature and the lateral curvature of the guide tracks 1308, 1310 convert linear movement of the vehicle 1302 in the direction of travel into a rolling motion of the vehicle 1302, similar to as described above in connection with the system 100.

Figure 14:
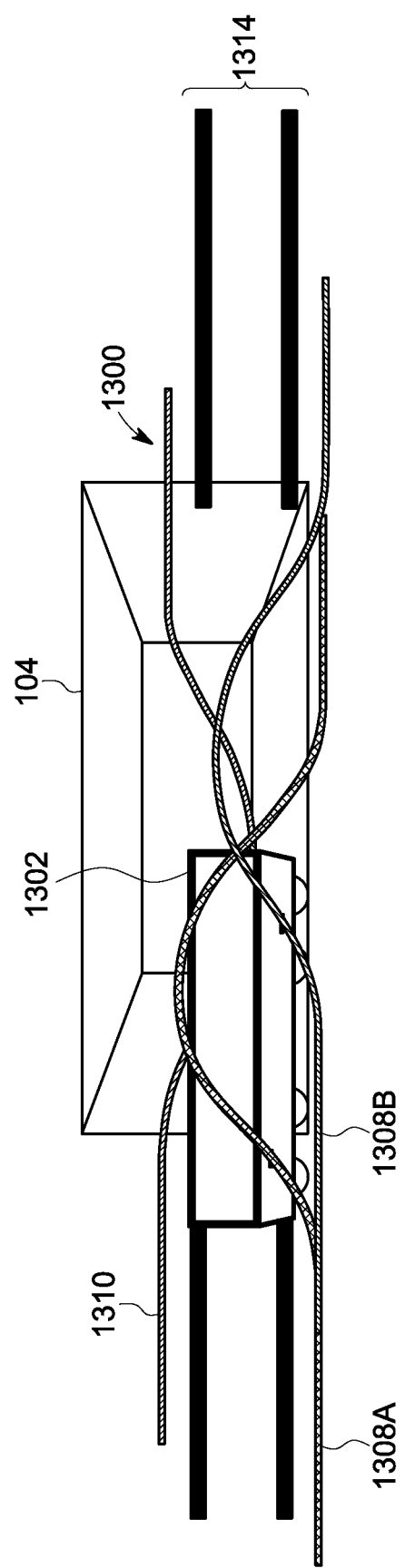
FIG. 14 illustrates a top view of the rolling system shown in FIG. 13 translating movement of the vehicle into rolling movement.
Figure 15:
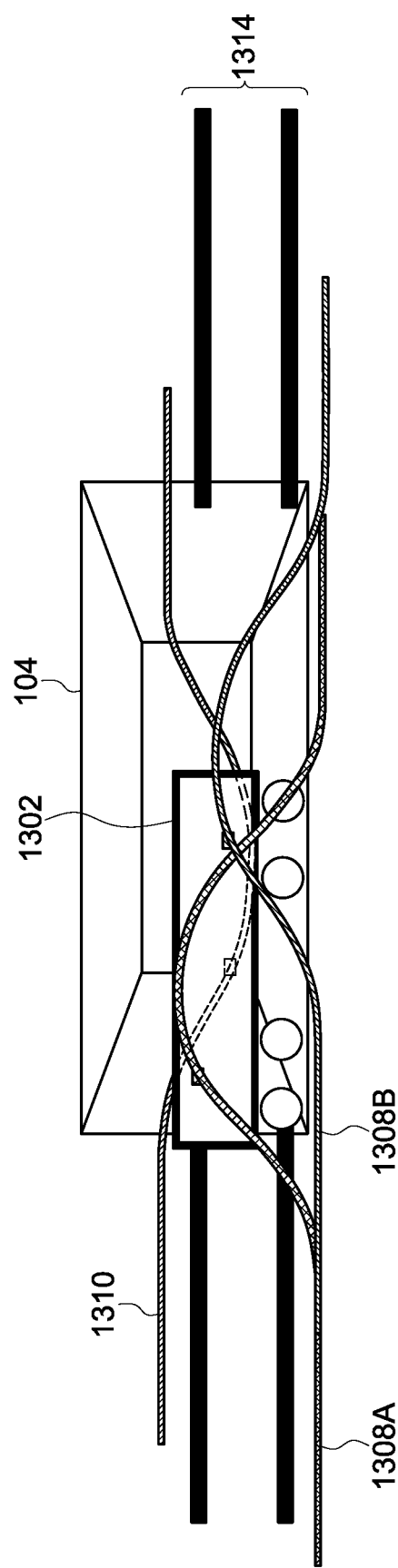
FIG. 15 illustrates a top view of the rolling system shown in FIG. 13 continuing to translate movement of the vehicle into rolling movement.
Figure 16:
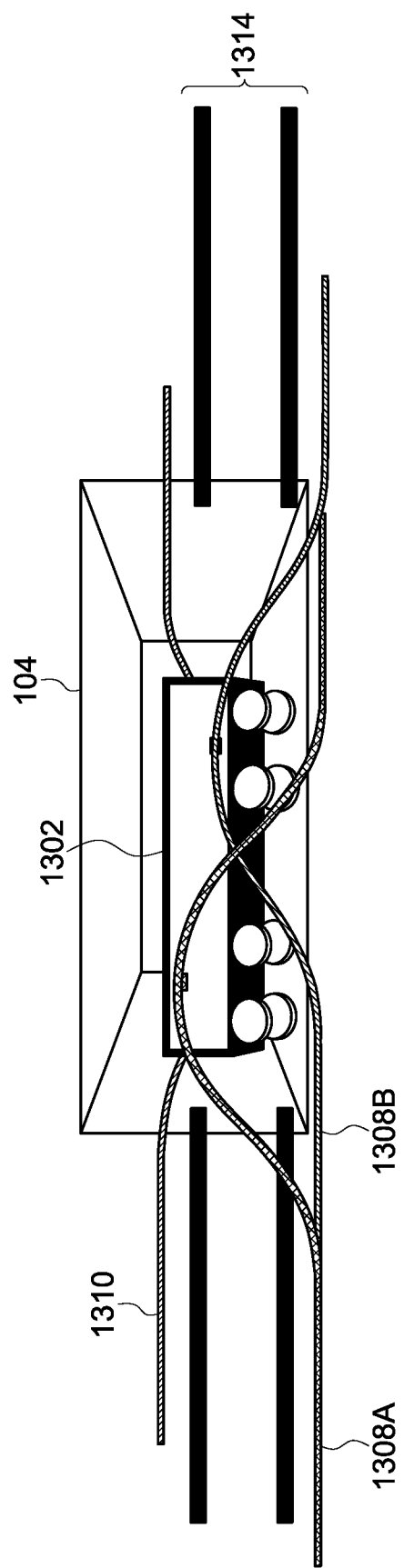
FIG. 16 illustrates a top view of the rolling system shown in FIG. 13 rotating the vehicle to a position where cargo is dumped into a receptacle.

FIGS. 14 through 16 show the rolling motion of the vehicle 1302. This rolling motion of the vehicle 1302 causes the vehicle 1302 to dump or otherwise dispense the cargo being carried by the vehicle 1302 into the receptacle 104 when the vehicle 1302 is disposed over the receptacle 104. The curved guide tracks 1308A, 1308B, 1310 can then convert continued movement of the vehicle 1302 in the direction of travel into a reverse rotation such that the vehicle 1302 returns to an upright position by the time the vehicle 1302 reaches the output segment of the route 1314, similar to as described above in connection with the system 100.

As described herein, example systems and methods for rotating vehicles in order to dump or otherwise dispense cargo from the vehicles in a continuous manner (e.g., in such a way that the vehicle can continue moving in a direction of travel above the receptacle) are provided. The systems can include three or more suspension points in order to control the fore and aft pitching movement that may otherwise occur with fewer suspension points. For example, the system 100 has four suspension points, including a first suspension point between the guide 126 on the side 300 (shown in FIG. 3) of the vehicle 102 and the guide track 108A, a second suspension point between the guide 128 on the side 300 of the vehicle 102 and the guide track 108B, a third suspension point between the guide 126 on the side 302 (shown in FIG. 3) of the vehicle 102 and the guide track 110A and a fourth suspension point between the guide 128 on the side 302 of the vehicle 102 and the guide track 110B. Alternatively, fewer suspension points may be used, such as in the system 1300, which has three suspension points. These suspension points include a first suspension point between the guide 1326 and the guide track 1308A, a second suspension point between the guide 1328 and the guide track 1308B, and a third suspension point between the guide 1330 and the guide track 1110. In another embodiment, live or more suspension points may be used. Additionally, the use of three or more suspension points can reduce the forces exerted on the guides and guide tracks relative to two-suspension point systems.

As described above, the guide tracks can be longitudinally spaced apart in or parallel to the direction of travel such that the guides on the vehicle simultaneously move in complementary curved pathways defined by the guide tracks. The simultaneous movement of the guides on opposite ends (e.g., leading and back ends) and/or opposite sides (e.g., lateral sides, such as left and right sides) of the vehicle can reduce or eliminate twisting of the vehicle about around) a longitudinal axis of the vehicle that is oriented parallel to or in the direction of travel. The ends of the vehicle may rotate around the longitudinal axis, but may not rotate by different amounts. For example, the simultaneous movement of the guides on the vehicle in the curved pathways defined by the guide tracks may cause both ends of the vehicle to simultaneously rotate around the longitudinal axis at the same speed and/or distance.

In embodiments, at least a portion of the receptacle for receiving dumped cargo is located below or under the input segment and output segment. That is, the input and output segments together define a plane, and the receptacle, or portion thereof, is located under/below the plane. Thus, when vehicles are rolled by the guide tracks when moved over the receptacle, dumped cargo falls into the receptacle, below the level of the segments, under action of gravity. This plane may be a horizontal plane that is defined by the parallel tracks of the input segment and/or the output segment of the route.

In one embodiment, a system for rolling a vehicle to dispense cargo from the vehicle includes first and second guide tracks. The first guide track extends over a receptacle positioned to receive the cargo being carried by the vehicle. The first guide track is elongated from an input segment of a route that leads the vehicle toward the receptacle to an output segment of the route that leads the vehicle away from the receptacle. The second guide track also extends over the receptacle and is elongated from the input segment of the route to the output segment of the route. The first and second guide tracks are disposed on opposite first and second sides, respectively, of the input segment of the route and the output segment of the route. The first guide track and the second guide track are shaped to engage first and second guides, respectively, that are coupled to opposite sides of the vehicle when the vehicle travels from the input segment of the route toward the output segment of the route and over the receptacle. The first guide track and the second guide track are curved over the receptacle to translate movement of the vehicle over the receptacle from the input segment of the route to the output segment of the route into a rolling motion of the vehicle that causes the cargo carried by the vehicle to be dumped into the receptacle.

In one aspect, the first guide track is curved upward and the second guide track is curved downward in sections of the first guide track and the second guide track that are disposed over the receptacle, with respect to a horizontal plane defined by the route.

In one aspect, the first guide track is curved from the first side of the route toward the second side of the route and the second guide track is curved from the second side of the route toward the first side of the route in sections of the first guide track and the second guide track that are disposed over the receptacle.

In one aspect, the first guide track and the second guide track are curved in approximate U-shapes in sections of the first guide track and the second guide track that are disposed over the receptacle.

In one aspect, the first guide track and the second guide track are curved to cause the vehicle to rotate more than ninety degrees as the vehicle moves over the receptacle.

In one aspect, the first guide track and the second guide track are curved to cause the vehicle to rotate more than one hundred twenty degrees as the vehicle moves over the receptacle.

In one aspect, the first guide track and the second guide track define channels that receive the guides coupled to the vehicle.

In one aspect, the first guide track and the second guide track extend over the receptacle but the route does not extend over at least a portion of the receptacle such that the first guide track and the second guide track support the vehicle when the vehicle moves over the receptacle.

In one aspect, the first guide track and the second guide track are shaped to translate the movement of the vehicle over the receptacle into the rolling motion of the vehicle that rotates the vehicle around an axis of rotation without twisting the vehicle.

In one aspect, the first guide track and the second guide track are shaped to translate the movement, of the vehicle over the receptacle into the rolling motion of the vehicle that rotates the vehicle around an axis of rotation without the first guide track moving relative to the ground and without the second guide track moving relative to the ground.

In one aspect, the vehicle is elongated along a direction of elongation and the first guide track and the second guide track are shaped to translate the movement of the vehicle over the receptacle into the rolling motion of the vehicle that rotates the vehicle around an axis of rotation that is parallel to the direction of elongation of the vehicle.

In one aspect, the vehicle is a rail vehicle comprising one or more wheels, axles, or bogies. The first and second guide tracks translate the movement of the vehicle into the rolling motion that also rotates the one or more wheels, axles, or bogies of the vehicle.

In one aspect, the system also includes a third guide track. The third guide track extends over the receptacle and is elongated from the input segment of the route to the output segment of the route. The third guide track is disposed on the first side of the input segment of the route and the output segment of the route. The third guide track is shaped to engage a third and guide that is coupled to the vehicle when the vehicle travels from the input segment of the route toward the output segment of the route and over the receptacle. The third guide track is curved over the receptacle to translate the movement of the vehicle over the receptacle into the rolling motion of the vehicle.

In one aspect, the first guide track and the third guide track are disposed at different heights over the input segment of the route and over the output segment of the route, with respect to a horizontal plane defined by the route.

In one aspect, the first guide track, the second guide track, and the third guide track are positioned to engage the respective first, second, and third guides of the vehicle at different locations along a length of the vehicle from a leading end of the vehicle to a trailing end of the vehicle. The leading end of the vehicle moves over the receptacle prior to the trailing end of the vehicle as the vehicle moves over the receptacle.

In one aspect, the first guide track, the second guide track, and the third guide track define curved pathways along which the respective first guide, second guide, and third guide move during travel of the vehicle over the receptacle. The curved pathways of the respective first, second, and third guide tracks have complementary shapes such that the respective first, second, and third guides simultaneously move along, the respective curved pathways without rotating leading and trailing ends of the vehicle around an axis that is parallel to the direction of travel at different speeds or in different amounts.

In one aspect, the system also includes third and fourth guide tracks. The third guide track extends over the receptacle and is elongated from the input segment of the route to the output segment of the route. The third guide track is disposed on the first side of the input segment of the route and the output segment of the route. The fourth guide track also extends over the receptacle and is elongated from the input segment of the route to the output segment of the route. The fourth guide track is disposed on the second side of the input segment of the route and the output segment of the route. The third guide track and the fourth guide track are shaped to engage third and fourth guides, respectively, that are coupled to the opposite sides of the vehicle when the vehicle travels from the input segment of the route toward the output segment of the route and over the receptacle. The third guide track and the fourth guide track also are curved over the receptacle to translate the movement, of the vehicle over the receptacle into the rolling motion of the vehicle.

In one aspect, the first guide track and the third guide track are disposed at different heights over the input segment of the route and over the output segment of the route. The second guide track and the fourth guide track are disposed at different heights over the input segment of the route and over the output segment of the route.

In one aspect, the vehicle is included in a vehicle consist having one or more additional vehicles mechanically interconnected with the vehicle. The system may also include a bypass segment of the route that is coupled with the input segment of the route and with the output segment of the route. The bypass segment of the route extends around the receptacle such that at least one of the additional vehicles can travel around the receptacle without engaging the first and second guide tracks over the receptacle.

In one aspect, the one or more additional vehicles of the vehicle consist include a leading powered vehicle and a trailing powered vehicle that are capable of self-propulsion. The leading powered vehicle is disposed ahead of the vehicle and the trailing powered vehicle disposed behind the vehicle along a direction of travel along the input segment of the route. The bypass segment of the route directs the leading powered vehicle of the vehicle consist around the receptacle after the leading powered vehicle disconnects from the vehicle while the trailing powered vehicle pushes the vehicle into engagement with the first and second guide tracks and over the receptacle.

In one aspect, the bypass segment of the route is connected with the output segment of the route such that the vehicle can reconnect with the leading powered unit after the vehicle has been pushed over the receptacle by the trailing powered unit.

In another embodiment, a method (e.g., for rolling a vehicle to unload cargo from the vehicle) includes engaging a first guide coupled to the vehicle carrying cargo with a first curved guide track that extends over a receptacle positioned to receive cargo being carried by the vehicle. The first curved guide track is elongated from an input segment of a route that leads the vehicle toward the receptacle to an output segment of the route that leads the vehicle away from the receptacle. The method also includes engaging a second guide coupled to the vehicle with a second curved guide track also extending over the receptacle and also elongated from the input segment of the route to the output segment of the route. The method further includes translating movement of the vehicle from the input segment of the route toward the output segment of the route into a rolling motion of the vehicle by moving the first and second guides along the first and second curved guide tracks. The rolling motion of the vehicle causes the cargo that is carried by the vehicle to be dumped into the receptacle.

In one aspect, translating the movement includes converting linear movement of the vehicle along a direction of travel into rotary movement of the vehicle over the receptacle.

In one aspect, engaging the first guide with the first curved guide track and engaging the second guide with the second curved guide track includes engaging the first and second guides disposed on opposite sides of the vehicle.

In one aspect, translating the movement of the vehicle includes moving the first guide along the first curved guide track in an upward curved path and moving the second guide along the second curved guide track in a downward curved path in sections of the first curved guide track and the second curved guide track that are disposed over the receptacle.

In one aspect, translating the movement of the vehicle includes moving the first guide along the first curved guide track in a first lateral curved path oriented from a first side of the route in the input segment of the route toward an opposite second side of the route in the output segment of the route. Translating the movement of the vehicle also includes moving the second guide along the second curved guide track in a second lateral curved path oriented from the second side of the route in the input segment of the route toward the opposite first side of the route in the output segment of the route.

In one aspect, translating the movement of the vehicle includes rotating the vehicle at least ninety degrees as the vehicle moves over the receptacle.

In one aspect, translating the movement of the vehicle includes rotating the vehicle at least one hundred twenty degrees as the vehicle moves over the receptacle.

In one aspect, engaging the first guide and engaging the second guide include receiving the first and second guides into channels defined by the first and second curved guide tracks, respectively.

In one aspect, translating the movement of the vehicle includes rotating the vehicle around an axis of rotation without twisting the vehicle.

In one aspect, the vehicle is elongated along a direction of elongation and translating the movement of the vehicle includes rotating the vehicle around an axis of rotation that is parallel to the direction of elongation of the vehicle.

In one aspect, the vehicle is a rail vehicle comprising one or more wheels, axles, or bogies. Translating the movement of the vehicle includes rotating the vehicle and the one or more wheels, axles, or bogies of the vehicle.

In one aspect, the method also includes engaging a third guide coupled to the vehicle with a third curved guide track that extends over the receptacle and is elongated from the input segment of the route to the output segment of the route. Translating the movement of the vehicle includes moving the third guide along the third curved guide track to generate the rolling motion of the vehicle.

In one aspect, engaging the first guide with the first curved guide track and engaging the third guide with the third curved guide track occurs at different heights over the input segment of the route.

In one aspect, engaging the first guide with the first curved guide track, engaging the second guide with the second curved guide track, and engaging the third guide with the third curved guide track occur at different locations along a length of the vehicle from a leading end of the vehicle to a trailing end of the vehicle. The leading end of the vehicle moves over the receptacle prior to the trailing end of the vehicle as the vehicle moves over the receptacle.

In one aspect, the first guide track, the second guide track, and the third guide track define curved pathways along which the respective first guide, second guide, and third guide move during travel of the vehicle over the receptacle. The curved pathways of the respective first, second, and third guide tracks have complementary shapes such that translating movement of the vehicle includes simultaneously moving the first guide, the second guide, and the third guide along the respective curved pathways without rotating leading and trailing ends of the vehicle around an axis that is parallel to the direction of travel at different speeds or in different amounts.

In one aspect, the method also includes engaging a third guide coupled to the vehicle with a third curved guide track that extends over the receptacle and is elongated from the input segment of the route to the output segment of the route. The method may further include engaging a fourth guide coupled to the vehicle with a fourth curved guide track that extends over the receptacle and is elongated from the input segment of the route to the output segment of the route. Translating the movement of the vehicle includes moving the third and fourth guides along the third and fourth curved guide tracks to generate the rolling motion of the vehicle.

In one aspect, engaging the first guide with the first curved guide track and engaging the third guide with the third curved guide track occurs at different heights over the input segment of the route. Engaging the second guide with the second curved guide track and engaging the fourth guide with the fourth curved guide track occurs at different heights over the input segment of the route.

In one aspect, the vehicle is included in a vehicle consist having a trailing powered vehicle capable of self-propulsion. The method also includes pushing the vehicle into engagement with the first curved guide track and with the second curved guide track using the trailing powered vehicle.

In one aspect, the vehicle consist includes a leading powered vehicle capable of self-propulsion and disposed on an opposite side of the vehicle as the trailing powered vehicle in the vehicle consist. The method can also include pulling the vehicle toward the receptacle with the leading powered vehicle, disconnecting the leading powered vehicle from the vehicle consist, moving the leading powered vehicle around the receptacle and the first and second curved guide tracks on a bypass segment of the route that is connected with the input segment and the output segment of the route, and reconnecting the leading powered vehicle with the vehicle consist after the trailing powered vehicle has pushed the vehicle over the receptacle.

In another embodiment, another system for a system for rolling a vehicle to dispense cargo from the vehicle includes first and second guide tracks. The first guide track extends over a receptacle positioned to receive the cargo being carried by the vehicle. The first guide track is elongated from an input segment of a route that leads the vehicle toward the receptacle to an output segment of the route that leads the vehicle away from the receptacle. The second guide track also extends over the receptacle and is elongated from the input segment of the route to the output segment of the route. The first guide track and the second guide track are shaped to engage first and second guides, respectively, that are coupled to opposite sides of the vehicle when the vehicle travels from the input segment of the route toward the output segment of the route and over the receptacle. At least a portion of the first guide track is vertically curved along an upward path, at least a portion of the second guide track is vertically curved along a downward path, and the first guide track and the second guide track are at least partially curved in opposite lateral directions oriented transverse to a direction of travel of the vehicle. The first guide track and the second guide track are curved to translate movement of the vehicle in the direction of travel over the receptacle from the input, segment of the route to the output segment of the route into a rolling motion of the vehicle that causes the cargo carried by the vehicle to be dumped into the receptacle.

In one aspect, the first and second guide tracks are disposed on opposite first and second sides, respectively, of the input segment of the route and the output segment of the route.

In one aspect, the first guide track and the second guide track are curved in approximate U-shapes in sections of the first guide track and the second guide track that are disposed over the receptacle.

In one aspect, the first guide track and the second guide track are curved to cause the vehicle to rotate more than ninety degrees as the vehicle moves over the receptacle.

In one aspect, the first guide track and the second guide track are curved to cause the vehicle to rotate more than one hundred twenty degrees as the vehicle moves over the receptacle.

In one aspect, the first guide track and the second guide track define channels that receive the guides coupled to the vehicle.

In one aspect, the first guide track and the second guide track extend over the receptacle but the route does not extend over at least a portion of the receptacle such that the first guide track and the second guide track support the vehicle when the vehicle moves over the receptacle.

In one aspect, the first guide track and the second guide track are shaped to translate the movement of the vehicle over the receptacle into the rolling motion of the vehicle that rotates the vehicle around an axis of rotation without twisting the vehicle.

In one aspect, the vehicle is elongated along a direction of elongation and the first guide track and the second guide track are shaped to translate the movement of the vehicle over the receptacle into the rolling motion of the vehicle that rotates the vehicle around an axis of rotation that is parallel, to the direction of elongation of the vehicle.

In one aspect, the vehicle is a rail vehicle comprising one or more wheels, axles, or bogies. The first and second guide tracks translate the movement of the vehicle into the rolling motion that also rotates the one or more wheels, axles, or bogies of the vehicle.

In one aspect, the system also includes a third guide track that also extends over the receptacle and also is elongated from the input segment of the route to the output segment of the route. The third guide track is shaped to engage a third guide that is coupled to the vehicle when the vehicle travels from the input segment of the route toward the output segment of the route and over the receptacle. At least a portion of the third guide track is curved to translate the movement of the vehicle in the direction of travel into the rolling motion of the vehicle.

In one aspect, the first guide track and the third guide track are disposed at different heights over the input segment of the route and over the output segment of the route.

In one aspect, the first guide track, the second guide track, and the third guide track are positioned to engage the respective first, second, and third guides of the vehicle at different locations along a length of the vehicle.

In one aspect, the system also includes third and fourth guide tracks. The third guide track extends over the receptacle and is elongated from the input segment of the route to the output segment of the route. The fourth guide track also extends over the receptacle and is elongated from the input segment of the route to the output segment of the route. The third guide track and the fourth guide track are shaped to engage third and fourth guides, respectively, that are coupled to opposite sides of the vehicle when the vehicle travels from the input segment of the route toward the output segment of the route and over the receptacle. At least a portion of the third guide track is vertically curved along an upward path, at least a portion of the fourth guide track is vertically curved along a downward path, and the third guide track and the fourth guide track are at least partially curved in opposite lateral directions oriented transverse to the direction of travel of the vehicle. The third guide track and the fourth guide track are curved to translate the movement of the vehicle along the direction of travel into the rolling motion of the vehicle.

In one aspect, the first guide track and the third guide track are disposed at different heights over the input segment of the route and over the output segment of the route. The second guide track and the fourth guide track are disposed at different heights over the input segment of the route and over the output segment of the route.

In one aspect, the first guide track and the second guide track are positioned to engage the first and second guides, respectively, of the vehicle at a leading end of the vehicle and the third guide track and the fourth guide track are positioned to engage the third and fourth guides, respectively, of the vehicle at a trailing end of the vehicle, the leading end of the vehicle moving over the receptacle prior to the trailing end of the vehicle as the vehicle moves over the receptacle.

In another embodiment, a system comprises a network of rail track defining a plane, and a receptacle. At least a portion of the receptacle (for receiving dumped cargo) is located below the plane. The network of rail track comprises an input track segment leading to, and terminating at, the receptacle, and an output track segment leading to, and terminating at, the receptacle. ("Terminating at" includes partially extending over an opening of the receptacle; however, the input track segment and the output track segment are not linked over the receptacle.) The system further comprises a first guide track and a second guide track both extending over the receptacle between the input, track segment and the output track segment. The first guide track and the second guide track are curved across the receptacle for at least partially inverting (e.g., at least 90 degrees) a non-powered rail vehicle engaged by the first guide track and the second guide track over the receptacle, for dumping cargo of the non-powered rail vehicle into the receptacle, when the non-powered rail vehicle is pulled or pushed from the input track segment over the receptacle to the output track segment. The network of track further comprises a bypass track segment coupled to the input track segment and to the output track segment and extending around the receptacle. The bypass track segment allows a powered rail vehicle that pulls the non-powered rail vehicle to be decoupled from the non-powered rail vehicle at the input track segment, motored over the bypass track segment for bypassing the receptacle, and at least indirectly recopied to the non-powered rail vehicle at the output track segment for pulling the non-powered rail vehicle over the receptacle. ("At least indirectly recoupled" means directly coupled or coupled by way of one or more intervening rail vehicles.)

In another embodiment, a system e.g., for travel of one or more vehicles) includes a network of rail track and a receptacle. The network of rail track defines a plane. At least a portion of the receptacle for receiving dumped cargo is located below the plane. The network of rail track includes an input track segment, an output track segment, a first guide track, and a second guide track. The input track segment leads to, and terminates at, the receptacle, and the output track segment leads to, and terminates at, the receptacle. The first guide track and the second guide track both extend over the receptacle between the input track segment and the output track segment. The first guide track and the second guide track are curved across the receptacle for at least partially inverting a non-powered rail vehicle engaged by the first guide track and the second guide track over the receptacle, for dumping cargo of the non-powered rail vehicle into the receptacle, when the non-powered rail vehicle is pulled or pushed from the input track segment over the receptacle to the output track segment. The network of track further comprises a bypass track segment coupled to the input track segment and to the output track segment and extending around the receptacle. The bypass track segment is for a powered rail vehicle that pulls the non-powered rail vehicle to be decoupled from the non-powered rail vehicle at the input track segment, motored over the bypass track segment for bypassing the receptacle, and at least indirectly recoupled to the non-powered rail vehicle at the output track segment for pulling, the non-powered rail vehicle over the receptacle.

In another embodiment, a method (e.g., for operating a vehicle consist) includes motoring a vehicle consist along a route towards a receptacle. The vehicle consist includes a first powered vehicle, a second powered vehicle, and a plurality of non-powered vehicles disposed between the first powered vehicle and the second powered vehicle. The method also includes subsequently decoupling the first powered vehicle from the vehicle consist and motoring the first powered vehicle along a bypass route around the receptacle. The method further includes subsequently pushing the plurality of non-powered vehicles, by the second powered vehicle, over and across the receptacle. The non-powered vehicles are engaged by plural curved guide tracks extending across the receptacle, as the non-powered vehicles are pushed over and across the receptacle, for at least partial inversion of the non-powered vehicles and continuous sequential dumping of cargo carried by the non-powered vehicles into the receptacle. The method also includes subsequently recoupling the first powered vehicle to the consist for pulling the non-powered vehicles over and across the receptacle under guidance of the guide tracks.

It is to be understood that the above description is intended to be illustrative, and not restrictive. For example, the above-described embodiments (and/or aspects thereon may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled, in the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the inventive subject matter and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

The invention claimed is:

1. A system comprising:
a first set of guide tracks extending over a receptacle positioned to receive cargo being carried by a vehicle, the first set of guide tracks elongated from first ends disposed above an input segment of a route that leads the vehicle toward the receptacle to second ends disposed above an output segment of the route that leads the vehicle away from the receptacle; and
a second set of guide tracks also extending over the receptacle, the second set of guide tracks also elongated from first ends disposed above the input segment of the route to second ends disposed above the output segment of the route, the first and second sets of guide tracks disposed on opposite first and second sides, respectively, of the input segment of the route and the output segment of the route,
wherein each of the first set of guide tracks and the second set of guide tracks includes a rear guide track and a front guide track, the rear guide tracks of the first and second sets of guide tracks shaped to engage rear guides coupled to opposite sides of the vehicle closer to a trailing end of the vehicle than a leading end of the vehicle along a direction of travel during movement of the vehicle from the input segment of the route toward the output segment of the route and over the receptacle, the front guide tracks of the first and second sets of guide tracks shaped to engage front guides coupled to opposite sides of the vehicle closer to the leading end of the vehicle than the trailing end of the vehicle along the direction of travel during the movement of the vehicle from the input segment of the route toward the output segment of the route and over the receptacle,
wherein the rear guide tracks of the first and second sets of guide tracks extend farther along the input segment of the route than the front guide tracks of the first and second sets of guide tracks such that the front guide tracks of the first and second sets of guide tracks engage the front guides of the vehicle and the rear guide tracks of the first and second sets of guide tracks engage the rear guides of the vehicle at the same time, and
wherein the first set of the guide tracks and the second set of the guide tracks are curved over the receptacle to translate movement of the vehicle over the receptacle from the input segment of the route to the output segment of the route into a rolling motion of the vehicle that causes the cargo carried by the vehicle to be dumped into the receptacle.

2. The system of claim 1, wherein the front guide tracks of the first and second sets of guide tracks are curved upward and the rear guide tracks of the first and second sets of guide tracks are curved downward in sections of the front tracks and the rear guide tracks that are disposed over the receptacle, with respect to a horizontal plane defined by the route.

3. The system of claim 1, wherein the front guide tracks of the first and second sets of guide tracks are curved from the first side of the route toward the second side of the route and the rear guide tracks of the first and second set of guide tracks are curved from the second side of the route toward the first side of the route in sections of the front guide tracks and the rear guide tracks that are disposed over the receptacle.

4. The system of claim 1, wherein the front guide tracks and the rear guide tracks of the first and second sets of guide tracks are curved in approximate U-shapes that face opposites sides of the vehicle in sections of the first and second sets of guide tracks that are disposed over the receptacle.

5. The system of claim 1, wherein the front guide tracks and the rear guide tracks of the first and second sets of guide tracks are curved to cause the vehicle to rotate more than ninety degrees as the vehicle moves over the receptacle.

6. The system of claim 1, wherein the front guide tracks and the rear guide tracks of the first and second sets of guide tracks are curved to cause the vehicle to rotate more than one hundred twenty degrees as the vehicle moves over the receptacle.

7. The system of claim 1, wherein the front guide tracks and the rear guide tracks of the first and second guide tracks define respective channels that receive the front and rear guides coupled to the vehicle.

8. The system of claim 1, wherein the front guide tracks and the rear guide tracks of the first and second sets of guide tracks extend over the receptacle but the route does not extend over at least a portion of the receptacle such that the front guide tracks and the rear tracks support the vehicle when during the movement of the vehicle moves-over the receptacle.

9. The system of claim 1, wherein the front guide tracks and the rear guide tracks of the first and second sets of guide tracks are shaped to translate the movement of the vehicle over the receptacle into the rolling motion of the vehicle that rotates the vehicle around an axis of rotation without twisting the vehicle or rotating the vehicle relative to the front guide tracks or the rear guide tracks.

10. The system of claim 1, wherein the vehicle is elongated along a direction of elongation and the front guide tracks and the rear guide tracks of the first and second sets of guide tracks are shaped to translate the movement of the vehicle over the receptacle into the rolling motion of the vehicle that rotates the vehicle around an axis of rotation that is parallel to the direction of elongation of the vehicle.

11. The system of claim 1, wherein the vehicle is a rail vehicle comprising one or more wheels, axles, or bogies, and wherein the first and second sets of guide tracks translate the movement of the vehicle into the rolling motion that also rotates the one or more wheels, axles, or bogies of the vehicle.

12. The system of claim 1, wherein the front guide track and the rear guide track in each of the first and second sets of guide tracks are disposed at different heights over the input segment of the route and over the output segment of the route, with respect to a horizontal plane defined by the route.

13. The system of claim 1, wherein the front guide tracks and the rear guide tracks in each of the first and second sets of guide tracks are positioned to engage the respective front and rear guides of the vehicle at different locations along a length of the vehicle from the leading end of the vehicle to the trailing end of the vehicle, the leading end of the vehicle moving over the receptacle prior to the trailing end of the vehicle as the vehicle moves over the receptacle.

14. The system of claim 1, wherein the front guide track and the rear guide tracks of the first and second set of guide tracks define curved pathways along which the respective front and rear guides move during travel of the vehicle over the receptacle, the curved pathways of the respective front and rear guide tracks having complementary shapes such that the respective front and rear guides simultaneously move along the respective curved pathways without rotating the leading and trailing ends of the vehicle around an axis that is parallel to the direction of travel at different speeds or different distances.

15. The system of claim 1, wherein the vehicle is included in a vehicle consist having one or more additional vehicles mechanically interconnected with the vehicle, and further comprising a bypass segment of the route that is coupled with the input segment of the route and with the output segment of the route, the bypass segment of the route extending around the receptacle such that at least one of the additional vehicles can travel around the receptacle without engaging the first and second sets of guide tracks over the receptacle.

16. The system of claim 15, wherein the one or more additional vehicles of the vehicle consist include a leading powered vehicle and a trailing powered vehicle that are capable of self-propulsion, the leading powered vehicle disposed ahead of the vehicle and the trailing powered vehicle disposed behind the vehicle along a direction of travel along the input segment of the route, and wherein the bypass segment of the route directs the leading powered vehicle of the vehicle consist around the receptacle after the leading powered vehicle disconnects from the vehicle while the trailing powered vehicle pushes the vehicle into engagement with the first and second sets of guide tracks and over the receptacle.

17. The system of claim 16, wherein the bypass segment of the route is connected with the output segment of the route such that the vehicle can reconnect with the leading powered unit after the vehicle has been pushed over the receptacle by the trailing powered unit.

18. A method comprising:
engaging a first guide coupled to a vehicle carrying cargo with a first curved guide track that extends over a receptacle positioned to receive cargo being carried by the vehicle, the first curved guide track elongated from an input segment of a route that leads the vehicle toward the receptacle to an output segment of the route that leads the vehicle away from the receptacle;

engaging a second guide coupled to the vehicle with a second curved guide track also extending over the receptacle and also elongated from the input segment of the route to the output segment of the route; and translating movement of the vehicle from the input segment of the route toward the output segment of the route into a rolling motion of the vehicle by moving the first and second guides along the first and second curved guide tracks, wherein the rolling motion of the vehicle causes the cargo that is carried by the vehicle to be dumped into the receptacle, wherein the vehicle is included in a vehicle consist having a trailing powered vehicle capable of self-propulsion, and further comprising pushing the vehicle into engagement with the first curved guide track and with the second curved guide track using the trailing powered vehicle, wherein the vehicle consist includes a leading powered vehicle capable of self-propulsion and disposed on an opposite side of the vehicle as the trailing powered vehicle in the vehicle consist, and wherein the method also includes:

pulling the vehicle toward the receptacle with the leading powered vehicle;

disconnecting the leading powered vehicle from the vehicle consist;

moving the leading powered vehicle around the receptacle and the first and second curved guide tracks on a bypass segment of the route that is connected with the input segment and the output segment of the route; and reconnecting the leading powered vehicle with the vehicle consist after the trailing powered vehicle has pushed the vehicle over the receptacle.

19. The method of claim 18, wherein translating the movement of the vehicle includes converting linear movement of the vehicle along a direction of travel into rotary movement of the vehicle over the receptacle.

20. The method of claim 18, wherein translating the movement of the vehicle includes moving the first guide along the first curved guide track in an upward curved path and moving the second guide along the second curved guide track in a downward curved path in sections of the first curved guide track and the second curved guide track that are disposed over the receptacle.

21. The method of claim 18, wherein translating the movement of the vehicle includes moving the first guide along the first curved guide track in a first lateral curved path oriented from a first side of the route in the input segment of the route toward an opposite second side of the route in the output segment of the route, and translating the movement of the vehicle includes moving the second guide along the second curved guide track in a second lateral curved path oriented from the second side of the route in the input segment of the route toward the opposite first side of the route in the output segment of the route.

22. The method of claim 18, further comprising engaging a third guide coupled to the vehicle with a third curved guide track that extends over the receptacle and is elongated from the input segment of the route to the output segment of the route, wherein translating the movement of the vehicle includes moving the third guide along the third curved guide track to generate the rolling motion of the vehicle.

23. The method of claim 22, wherein engaging the first guide with the first curved guide track and engaging the third guide with the third curved guide track occurs at different heights over the input segment of the route.

24. The method of claim 22, wherein engaging the first guide with the first curved guide track, engaging the second guide with the second curved guide track, and engaging the third guide with the third curved guide track occur at different locations along a length of the vehicle from a leading end of the vehicle to a trailing end of the vehicle, the leading end of the vehicle moving over the receptacle prior to the trailing end of the vehicle as the vehicle moves over the receptacle.

25. The method of claim 22, wherein the first guide track, the second guide track, and the third guide track define curved pathways along which the respective first guide, second guide, and third guide move during travel of the vehicle over the receptacle, the curved pathways of the respective first, second, and third guide tracks having complementary shapes such that translating movement of the vehicle includes simultaneously moving the first guide, the second guide, and the third guide along the respective curved pathways without rotating leading and trailing ends of the vehicle around an axis that is parallel to the direction of travel at different speeds or in different amounts.

26. A system comprising:
a first set of guide tracks extending over a receptacle positioned to receive cargo being carried by a vehicle, the first guide tracks elongated from first ends disposed above an input segment of a route that leads the vehicle toward the receptacle to second ends disposed above an output segment of the route that leads the vehicle away from the receptacle; and
a second set of guide tracks also extending over the receptacle, the second set of guide tracks also elongated from first ends disposed above the input segment of the route to second ends disposed above the output segment of the route;
wherein each of the first set of guide tracks and the second set of guide tracks includes a rear guide track and a front guide track, the rear guide tracks of the first and second sets of guide tracks shaped to engage rear guides coupled to opposite sides of the vehicle closer to a trailing end of the vehicle than a leading end of the vehicle along a direction of travel during movement of the vehicle from the input segment of the route toward the output segment of the route and over the receptacle, the front guide tracks of the first and second sets of guide tracks shaped to engage front guides coupled to opposite sides of the vehicle closer to the leading end of the vehicle than the trailing end of the vehicle along the direction of travel during the movement of the vehicle from the input segment of the route toward the output segment of the route and over the receptacle, wherein the rear guide tracks of the first and second sets of guide tracks extend farther along the input segment of the route than the front guide tracks of the first and second sets of guide tracks such that the front guide tracks of the first and second sets of guide tracks engage the front guides of the vehicle and the rear guide tracks of the first and second sets of guide tracks engage the rear guides of the vehicle at the same time, wherein at least a portion of the front guide tracks of the first and second sets of guide tracks is vertically curved along an upward path, at least a portion of the rear guide tracks of the first and second sets of guide tracks is vertically curved along a downward path, and the front guide tracks and the rear guide tracks are at least partially curved in opposite lateral directions oriented transverse to the direction of travel of the vehicle, and wherein the front guide tracks and the rear guide tracks are curved to translate the movement of the vehicle in the direction of travel over the receptacle from the input segment of the route to the output segment of the route into a rolling motion of the vehicle that causes the cargo carried by the vehicle to be dumped into the receptacle.

27. The system of claim 26, wherein the front and rear guide tracks of the first and second sets of guide tracks are disposed on opposite first and second sides, respectively, of the input segment of the route and the output segment of the route.

28. The system of claim 26, wherein the front guide tracks and the rear guide tracks of the first and second sets of guide tracks define channels that receive the respective front and rear guides coupled to the vehicle.

29. The system of claim 26, wherein the front tracks and the rear guide tracks of the first and second sets of guide tracks extend over the receptacle but the route does not extend over at least a portion of the receptacle such that the front guide tracks and the rear tracks support the vehicle during the movement of the vehicle over the receptacle.

30. The system of claim 26, wherein the front guide track and the rear guide track in each of the first and second sets of guide tracks are disposed at different heights over the input segment of the route and over the output segment of the route.

31. The system of claim 26, wherein the front guide tracks and the rear guide tracks of the first and second sets of guide tracks are positioned to engage the front and rear guides of the vehicle at different locations along a length of the vehicle.

* * * * *